(12) United States Patent
Beckman

(10) Patent No.: US 11,740,457 B2
(45) Date of Patent: Aug. 29, 2023

(54) AUGMENTED REALITY DISPLAY SYSTEMS ENHANCING VIRTUAL IMAGES WITH REDIRECTED LIGHT

(71) Applicant: Christopher V. Beckman, Los Angeles, CA (US)

(72) Inventor: Christopher V. Beckman, Los Angeles, CA (US)

(*) Notice: Subject to any disclaimer, the term of this patent is extended or adjusted under 35 U.S.C. 154(b) by 73 days.

(21) Appl. No.: 17/246,660

(22) Filed: May 2, 2021

(65) Prior Publication Data

US 2021/0318538 A1 Oct. 14, 2021

Related U.S. Application Data

(63) Continuation of application No. 16/460,997, filed on Jul. 2, 2019, now Pat. No. 10,996,472, which is a
(Continued)

(51) Int. Cl.
*G02B 27/01* (2006.01)
*G06F 3/01* (2006.01)
(Continued)

(52) U.S. Cl.
CPC ......... *G02B 27/0103* (2013.01); *G02B 27/01* (2013.01); *G02B 27/0101* (2013.01); *G06F 3/013* (2013.01); *H04N 5/77* (2013.01); *H04N 23/55* (2023.01); *H04N 23/687* (2023.01); *B60J 3/04* (2013.01); *G02B 2027/0109* (2013.01); *G02B 2027/0118* (2013.01); *G02B 2027/0123* (2013.01); *G02B 2027/0134* (2013.01);
(Continued)

(58) Field of Classification Search
USPC .......... 359/13, 237, 601, 613; 296/97.2, 972
See application file for complete search history.

(56) References Cited

U.S. PATENT DOCUMENTS 5,076,668 A * 12/1991 Dalisa ................... G02F 1/1375
349/86
5,305,012 A * 4/1994 Faris ....................... A61F 9/023
359/604
(Continued)

*Primary Examiner* — Clayton E. LaBalle
*Assistant Examiner* — Warren K Fenwick

(57) ABSTRACT

New augmented reality display systems are provided, some of which incorporate "shifted-reality" techniques. In some embodiments, an augmented reality display system includes a matrix of light-augmenting pixels within a variable-transmission, semi-transparent screen (e.g., an augmented reality headset, comprising a semi-transparent screen) and creates redirected, attenuated and augmented light and shading to form and alter virtual objects. In some embodiments, a plurality of angle-alterable, shiftable sources (e.g., light-focusing and -directing pixels), aids in creating virtual objects of greater realism than conventional 3D imaging methods, and aids in reducing the appearance of other objects or conditions. In some aspects, existing images and objects may be shifted in perspective for an observer, and enhanced and overlaid with effects and demonstrative information related to them and a surrounding environment. In other aspects, the system builds and accesses an object structure and materials library and object inventory, enriching a user's augmented reality experience.

20 Claims, 17 Drawing Sheets

Related U.S. Application Data continuation-in-part of application No. 15/702,732, filed on Sep. 12, 2017, now Pat. No. 10,338,385, which is a continuation-in-part of application No. 15/138,481, filed on Apr. 26, 2016, now Pat. No. 9,759,916, and a continuation-in-part of application No. 14/703,873, filed on May 4, 2015, now Pat. No. 9,911,209, said application No. 15/138,481 is a continuation-in-part of application No. 14/543,671, filed on Nov. 17, 2014, now Pat. No. 9,321,329, which is a continuation-in-part of application No. 13/468,977, filed on May 10, 2012, now Pat. No. 8,888,304, said application No. 14/703,873 is a continuation-in-part of application No. 13/329,190, filed on Dec. 16, 2011, now Pat. No. 9,053,578, and a continuation-in-part of application No. 13/326,235, filed on Dec. 14, 2011, now abandoned.

(51) Int. Cl.
| | | |
|---|---|---|
| *H04N 5/77* | (2006.01) | |
| *H04N 23/55* | (2023.01) | |
| *H04N 23/68* | (2023.01) | |
| *G03B 11/04* | (2021.01) | |
| *B60J 3/04* | (2006.01) | |
| *H04N 23/63* | (2023.01) | |

(52) U.S. Cl.
CPC ............ *G02B 2027/0136* (2013.01); *G02B 2027/0138* (2013.01); *G02B 2027/0187* (2013.01); *G03B 11/045* (2013.01); *H04N 23/632* (2023.01)

(56) References Cited

U.S. PATENT DOCUMENTS

| | | | | |
|---|---|---|---|---|
| 6,056,424 | A * | 5/2000 | DiNunzio | B60Q 3/85 362/490 |
| 7,091,973 | B1 * | 8/2006 | Cohen | G06T 15/50 345/426 |
| 7,134,707 | B2 * | 11/2006 | Isaac | B60J 3/04 296/97.2 |
| 7,199,767 | B2 * | 4/2007 | Spero | G02B 27/01 359/601 |
| 7,355,161 | B2 * | 4/2008 | Romig | B60J 3/04 250/221 |
| 7,924,516 | B2 * | 4/2011 | Marquette | B60R 11/00 296/97.7 |
| 9,827,835 | B2 * | 11/2017 | El Idrissi | B60J 3/04 |
| 9,996,977 | B2 * | 6/2018 | O'Connor | G02B 27/0093 |
| 2009/0058126 | A1 * | 3/2009 | Broude | B60J 3/04 296/97.2 |
| 2009/0204291 | A1 * | 8/2009 | Cernasov | G02C 7/101 359/601 |
| 2010/0065721 | A1 * | 3/2010 | Broude | B60J 3/04 250/201.1 |
| 2010/0094501 | A1 * | 4/2010 | Kwok | B60J 3/04 359/609 |
| 2011/0209319 | A1 * | 9/2011 | Williams | B64C 1/1492 29/402.01 |
| 2011/0233384 | A1 * | 9/2011 | Wu | G01J 1/06 250/208.2 |

\* cited by examiner

AUGMENTED REALITY DISPLAY SYSTEMS ENHANCING VIRTUAL IMAGES WITH REDIRECTED LIGHT

RELATED APPLICATION DATA

This application is a continuation of co-pending U.S. patent application Ser. No. 16/460,997, filed Jul. 2, 2019, which is a continuation of Ser. No. 15/702,732, filed Sep. 12, 2017, which itself is a continuation-in-part of U.S. patent application Ser. No. 15/138,481, filed Apr. 26, 2016, which itself is a continuation-in-part of U.S. patent application Ser. No. 14/543,671, filed Nov. 17, 2014, which itself is a continuation-in-part of U.S. patent application Ser. No. 13/468,977, filed May 10, 2012. U.S. patent application Ser. No. 15/702,732 is also is a continuation-in-part of Ser. No. 14/703,873, filed May 4, 2015, which itself is a continuation-in-part of U.S. patent application Ser. No. 13/329,190, filed Dec. 16, 2011, and is also a continuation-in-part of U.S. patent application Ser. No. 13/326,235, filed Dec. 14, 2011. The entire contents of each of the above applications are hereby incorporated by reference in their entirety into the present application.

FIELD OF THE INVENTION

The present invention relates to the field of camera, display and other optic control systems. In particular, the invention relates to new augmented reality and other mediated reality techniques. The present invention also relates to the field of automotive components, and enhanced windshields.

BACKGROUND

Heads-up displays (or "HUDs") have been in use at least since the 1960s, predominantly in military vehicle applications. HUDs of that nature generally create a read-out of vehicle and navigation-related information on or near a semi-transparent canopy and within in a pilot's natural line of site for observing the environment surrounding the vehicle that he or she is controlling. Often, such HUDs operate by reflecting light off of semi-transparent surfaces and into the pilot's field of vision by an information read-out projector.

Various forms of 3-dimensional ("3D") displays have been introduced over the last century, including stereoscopic displays, which create a different perspective image for each of a user's eyes. In some embodiments, such displays incorporate a pair of glasses mounted on a user's head (a.k.a. a "headset," "headset display" or "head-mounted augmented reality system"), to filter or otherwise introduce different light for each of a user's eyes.

Structural stabilizing devices have also been used in conjunction with camera systems for years, and include rolling dollies and the steady-cam, developed by Garrett Brown. Such stabilizing devices create a smooth-follow effect when recording visual information with a camera that is moving over uneven terrain or while in the hands of a vertically oscillating operator—e.g., a person walking—by the use of iso-elastic spring-loaded arms.

It should be understood that the disclosures in this application related to the background of the invention in, but not limited to, this section (titled "Background") are to aid readers in comprehending the invention, and are not necessarily prior art or other publicly known aspects affecting the application; instead the disclosures in this application related to the background of the invention may comprise details of the inventor's own discoveries, work and work results, including aspects of the present invention. Nothing in the disclosures related to the background of the invention is or should be construed as an admission related to prior art or the work of others prior to the conception or reduction to practice of the present invention.

SUMMARY OF THE INVENTION

New visual control systems are provided that implement a new form of augmented and mediated reality, known as "shifted reality." In some aspects of the invention, a variably, directionally light-blocking, light-generating and light transmitting screen and actuating system is provided, which limits, transmits and generates levels of light at particular directions, for an observation point. In some embodiments, a matrix of specialized pixels creates variably-directed light with a plurality of angle-directable, shiftable sources, which aids in creating virtual, 3D objects of greater realism than conventional 3D imaging methods, and aids in reducing the appearance of other objects or conditions. In these aspects, existing images and objects viewed through a screen may be shifted in perspective for an observer, and enhanced and overlaid with effects and demonstrative information related to viewable objects and a surrounding environment. In other aspects of the invention, the system builds and accesses an object structure and materials library, based in part on input from a user, and, in part, on methodical observation with a specialized group of sensors. Preferably, one observation sensor is non-visual (e.g., ultrasound), but observes an environment in a mappably-related perspective as a visual sensor. In other aspects of the invention, the system builds and accesses an object structure and materials library, based on observation with a specialized group of sensors, and creates 3D augmentations, attenuations and other alterations, based on that library. The system may create an array of subdividing material and structural categories, within that library. The system may apply the library to an object inventory, and later correct the object inventory, and associating structures and materials with objects within that object inventory, based on such ongoing observation.

Other new optic control systems are also provided that control and augment and control camera, user or environmental movement and other optical factors.

Definitions and Construction

Within the context of this application, unless otherwise indicated, the following terms have the specific meaning described herein:

"Actuable" in addition to its ordinary meaning and special meaning in the art, is an adjective meaning that the noun modified by the adjective, such as a device, object, interface or condition, is able to be actuated or controlled (for example, by input), including, but not limited to each of the following: able to be actuated or controlled by external indications or input devices, changed stimulus, movement, and/or communication.

A "Brighter," "Brighter than Average," "Bright Source," or "Bright Light Source," in addition to its ordinary meaning and special meaning in the art, means an object within an observable environment, which object is a source of light that is of greater luminance per unit of an observer/user's eye's lens, retina or field of vision receiving light and/or an image of the object than at least one other object viewed or within the field of view of the observer/user, or means a more luminous than the average luminance of a substantial section of the environment, for example, the viewable section or the remainder of the environment other than the object that is a source of greater luminance, per unit of an observer/user's eye's lens, retina or field of vision occupied by light and/or an image from the section of the environment.

"Observation point-destined light," in addition to its ordinary meaning and special meaning in the art, means light that, if passing through a screen or through some semi-transparent, actuable light-affecting medium and/or matrix, would intersect with a user's eye, eye lens or retina or other observation point if not blocked by the screen, medium or matrix and/or other objects between the screen, medium or matrix and the user's eye or another observation point (location point, area, region or space at which light is sensed).

"Shifted Reality," in addition to meaning and sense set forth in greater detail below, relates to a new form of mediated reality in which light emanating from a viewed environment is diverted, redirected, or otherwise altered and combined with artificial light by a system to create a modified view of an environmental object and virtual object or effect.

It should be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

DETAILED DESCRIPTION OF THE DRAWINGS

Figure 1:
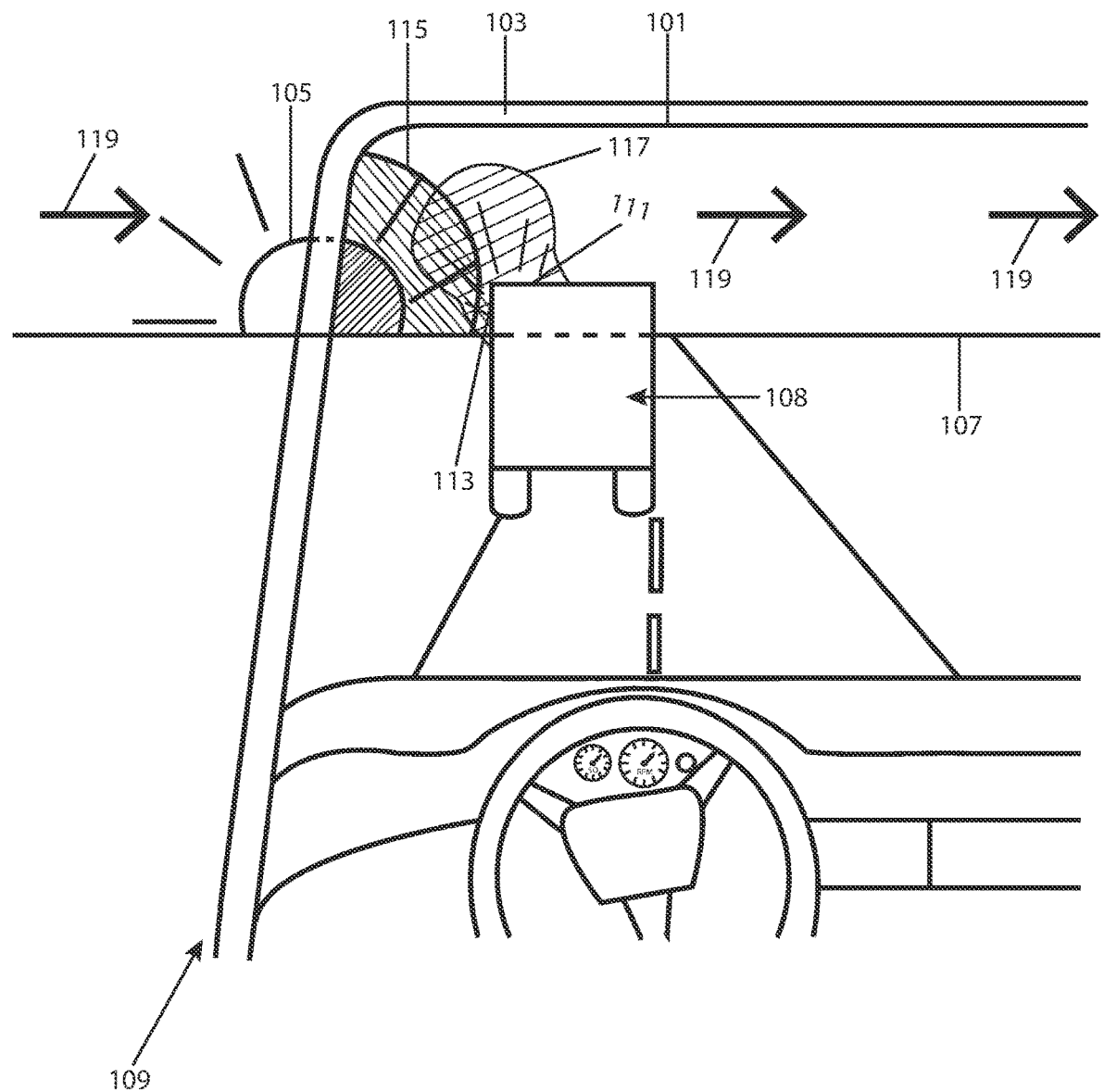
FIG. 1 depicts a vehicle operator's environmental view, as altered and augmented by certain optic conditioning aspects of the present invention, as well as some surrounding environmental factors.

FIG. 1 depicts part of a vehicle operator/user's environmental view, as augmented by certain optic conditioning aspects of the present invention, as well as some environmental factors surrounding a user. A transparent windshield 101 held within mounting frame 103 allows a motor vehicle driver to view part of an environment surrounding the motor vehicle (in this example, a road scene). Elements of the environment depicted in FIG. 1 include a sun 105 setting into a horizon 107, and a tractor trailer 108 facing away from the user's vehicle, 109. The sun 105 is an original source of non-reflected light that enters the user's field of vision and is brighter (causes an image or light more luminous at the viewer's eyes, eye lenses or retina, or other observation point) than other object light sources within the user's field of vision, per unit area or space at the observation point. Reflective surfaces 111 and 113 on the tractor-trailer reflect sunlight through the windshield 101 and into the user's field of vision. As will be explained in greater detail with respect to additional figures, below, a system according to aspects of the present invention, such as a system creating dynamically-shaped, -positioned and -attributed shading, attenuating, augmenting or otherwise directional light-affecting conditions 115 and 117, causes a regional area of the windshield 101 to appear to be shaded for one user of the system, and, preferably, for that user of the system in particular, reducing the amount of light permitted to enter that user's field of vision after passing through that area while leaving its prior transparency apparently intact for other observers or users. Furthermore, and as will also will be explained in greater detail with respect to additional figures below, shading conditions 115 and 117 may be placed in, or may have appended to them, leading positions along a user's field of vision, as defined by the direction of movement of brighter (more luminous in terms of candela per area, space and/or over time at an observation point) than average, or brighter than another predefined threshold, light sources, such as sources 105, 111 and 113. In the instance of FIG. 1, motion arrows 119 show that some brighter than average light sources within the user's field of view, 105, 111 and 113 (leading to shading), are moving toward the right-hand side of the user's field of vision, due, for example, to the user turning the vehicle left. As a result, additional leading margins to the right-hand side of conditions 115 and 117 may be included to ensure shading and other regional attributes that cover bright increases in light from different angles entering the user's field of vision due to those sources in future instances, despite any lag in region creation or brightness assessment that would occur only from sensing light and creating shading conditions for that light afterwards. Alternatively, or in addition to that approach, the system may assess a probable future location and shift conditions 115 and 117 to regions that will intercept future light from the object that is brighter than the tolerance threshold set by the system and/or user, for example, by implementing identification, definition and tracking of bright objects, relative to observation points (i.e., the user's eye). After movement leading to additional shading, shading movement, or leading margins has ceased or has been altered, the system may then remove or alter that additional shading. It should be noted, as will be amplified below, that the system or user may change brightness threshold settings (luminosity levels and ratios for objects and the environment, both overall and by region) that will lead to creating shading or augmenting features to optimize system performance and reduce lighting differentials between viewable objects in a user's field of vision according to ambient—overall and regional (e.g., object light source feature-specific—lighting conditions). For example, a lower or greater amount of dynamic shading or other dynamic attributes of conditions 115 and 117 might be used in lower overall light conditions, depending on the relative brightness of the shaded source in comparison to environmental light conditions, as may be determined by environmental light sensor(s). Greater differentials will generally require greater shading for brighter objects (a.k.a., one "transmission coefficient"), while reducing or removing general or environmental shading on the shield or matrix for an observation point. Smaller differentials, in bright overall conditions, on the other hand, may require the entire shield to be shaded to some degree (a.k.a. another "transmission coefficient"), and more even concentration throughout the shield for an observation point.

Sources of different brightness and other visual qualities and shapes may be managed by differently shaped shaded, attenuated or otherwise enhanced conditions created by actuable, variable degree of actuation (a.k.a. functional "weighting"), and variable direction-of-light-affecting, regions of the windshield matrix. One exemplary device limiting light passing through a shield or other matrix at particular angles is provided in reference to FIG. 12, below, which is an exemplary curved pixel of a type that can uniformly cover a screen, which may comprise regions of switchable shading/transparency states (i.e. capable of variable transmission of light)—for example, with a plurality of separately-actuable cells of nematic LCD liquid crystals (such as exemplary nematic crystal actuating cell 1290), each covering light transmitted from one of underlying light-emitting junctions or other sources—covering and variably shading light transmitted at a wide variety of directions through a particular point in the screen as the cells are actuated by the system. For instance, because reflective surface source objects 111 and 113 may reflect and produce light dimmer (less luminous) than the sun 105 at an observation point, shading regions creating shading condition 115 may be more strongly shaded (i.e., resulting from a greater weighting by the system) than shading regions creating shading condition 117 (i.e., allowing less light from that source to enter the eye of a user of the system, or other viewing destination. In addition, shading condition 117 may enhance the viewer's view of edges 111 and 113 by generating a high contrast superimposed (from the user's point of view) image, preferably, also on the matrix, which may be accomplished by retaining edge contrast and object definition and/or adding new viewing point destined light (a.k.a. a "spatial backlight") with a clearer, easier to view image, to better define a viewed object's (such as the truck's) edges and other attributes.

In one embodiment, a luminance limit is implemented at an observation focal point, preferably, based in part on overall brightness in the user's field of vision and, even more preferably, based in part on changes in brightness levels in the user's field of vision, and the amount of time a user's eye's have had to adjust to changed lighting conditions. This luminance limit is also preferably based on the capability of the user's eyes (or user's eyes in general) to withstand luminance levels above and below the luminance limit (under the environmental light conditions encountered by the user). In some embodiments, the user's age, eye condition and other relevant user and environmental factors may be factors additionally impacting the luminance limit implemented. In any event, when such a luminance limit is implemented by the system, shading (such as the shading discussed in this application) is implemented to the degree necessary to strictly prevent the brightness levels experienced at any observation point to a level according to the factors discussed immediately above. In other words, light leading to a brightness level exceeding the limit is completely blocked, and not permitted to cause a brightness level exceeding the limit. To maintain images of the environment while implementing this limit, tone mapping may be implemented to reduce or otherwise adjust other brightness levels of any object within the observer's field of view, relative to the resulting reduced brightness of objects in the observer's field of view resulting from implementing such a limit. In some embodiments, the limit imposed prevents any possible retinal damage, or any possible long-term retinal damage, for the user, or an average or healthy individual, which can vary based on age and other factors. This limit can vary depending on the length of time of exposure, and, with eye tracking, the directness of amount of focus on the resulting light-limited object of a user's eyes.

In the event that the system fails to implement the limit, or otherwise fails adequately to maintain or restore safe viewing and operating conditions for a user, the system may take further cautionary measures. For example, in a vehicle implementing artificial intelligence for navigation or driving, the system may cause the system/car to assess objects that pose a risk of collision, and take evasive action to prevent such collisions (e.g., safely steer the vehicle away from collision, or arrest the vehicle's movement). In some embodiments, the system may issue alerts or otherwise communicate the potentially dangerous condition to other vehicles, or issue commands to other vehicles causing them to take coordinated evasive actions, if the evasive actions taken with the user's vehicles may not be adequate to maintain safety.

Figure 2:
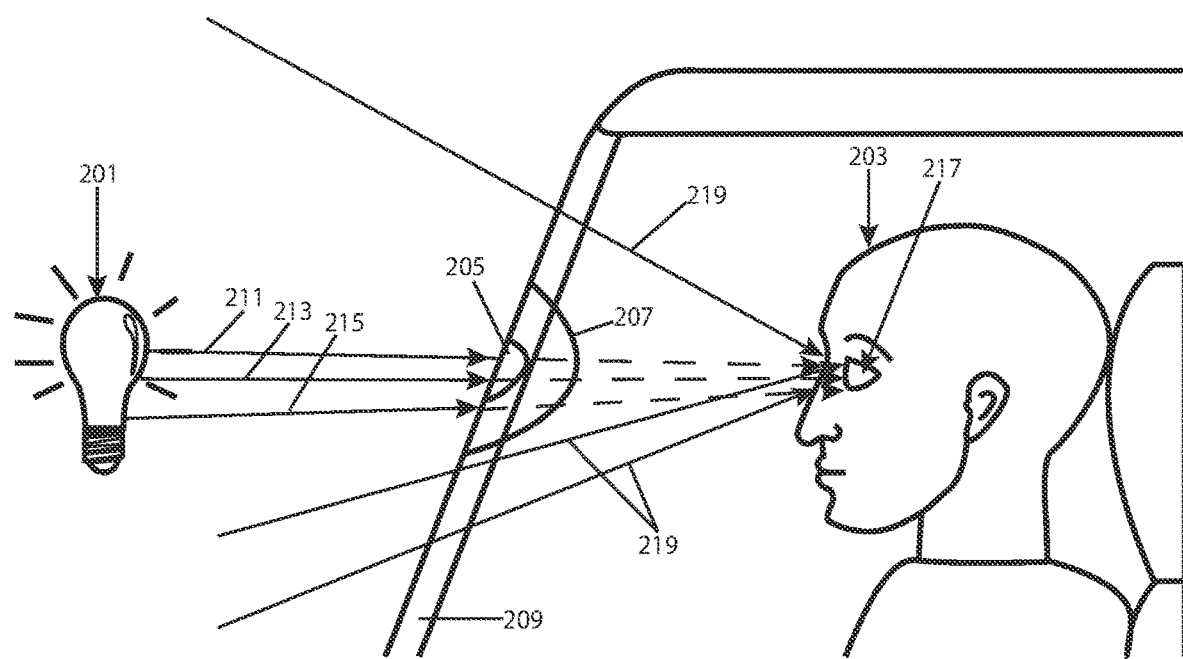
FIG. 2 depicts a side view of an operator seated in a motor vehicle, and observing an environment with the aid of hardware implementing aspects of the present invention.

FIG. 2 depicts a side view of an operator seated in a motor vehicle, and observing an environment with the aid of hardware implementing aspects of the present invention. A light-generating object 201 is within the user's observable environment (comprising a road scene, in the example pictured), and is observed by the user 203. Dynamically-shaped and attributed shading, attenuating, augmenting or otherwise light-affecting conditions 205 and 207 condition, modify, shade, reduce, enrich or otherwise limit and/or augment light passing through semi-transparent, regionally actuable windshield/matrix 209, as variably set by the user and/or system. (Semi-transparent, regionally actuable windshield/matrix 209 can also be referred to as, and comprises, a "screen with variable transmission" or as a "screen with variable light transmission," inherently, and based on the description set forth elsewhere in this application.) For example, light rays exceeding a threshold brightness (luminance) level per square area of the windshield through which the light passes, or that is projected to exceed a threshold level of brightness per unit of the user's field of vision, area of eye lens or retina, when passing through the windshield and to the user's eye or retina per area of eye or retina (an "observation point," 217), may be attenuated or shaded by an electrically, magnetically, or otherwise system-actuable or variable optic control in just those regions of the windshield through which such rays pass, and which optic control (such as actuable, directional shading within the regions) may selectively control, limit or augment light passing through at particular angles converging on a probable observation point, or group of actual or probable observation points. For example, exemplary rays 211, 213 and 215 depict some potential paths of light rays originating from the bright light-generating source 201, and passing through such shading or attenuating conditions 205 and 207. Rays 211 and 213 depict the path of light originating from an especially bright region of source 201, such as the center of a light bulb, which may be determined by the system by noting a differential in bright source regions (after randomly, systematically or otherwise assessing potential regional divisions) of the potential field of vision at the observation point impacted by source 201, and dividing source 201 into such different regions if the system determines the division and resulting conditions (with or without blending) to be efficient enough given an efficiency requirement that may be variably set by the user. Ray 215, by contrast, originates from a slightly less bright region (less candela per area, measured by rays cast from it, landing at the same observation point) of source 201.

As rays 211 and 213 pass through the windshield, their origination from a source yielding a higher level of brightness per area at the eye, lens, retina or other observing point for the user (as is deduced by the system based on sensory information obtained by the system) leads to the creation of a specialized attenuating, shading or otherwise light altering or augmenting condition 205, which affects all or part of all rays originating from such a brighter region of source 201 and destined for an observation point, within a tolerance range for determining such an especially bright region, and with a margin for absorbing unpredicted rays and orientations, which margin may be variably set and may lead the movement of rays from such a bright region, based on perceived and predicted relative motion paths, or potential relative motion paths, of the source 201, the user 203, and/or the windshield 209, with respect to one another, in order to ensure a minimum probability of shading, attenuating or otherwise augmenting light rays projected to exceed a system threshold at the observation point. Light rays originating from a region of source 201 that is below a brightness threshold, but above another, lower brightness threshold exceeding average environmental or field of vision brightness per unit of field of vision or area of rays landing on an observation point, and which are projected also to intersect at the observation point 217, yield a second shading, attenuating or otherwise light-altering region 207, which may have less of a shading, attenuating or otherwise augmenting impact on such light rays passing through it. In this way, the source 201 may remain viewable in its entirety, rather than completely or partially blocked from viewing, in a graduated or gradated effect created by the multiple regions 205 and 207 (the former of which is generally greater in shading) blending together in a graduated manner. Light determined to be below the lower brightness (luminance) threshold, such as light passing along ray paths 219, may pass through the windshield unaffected, or less affected, by such specialized shading, attenuating or otherwise augmenting regions, but the overall matrix may be variably, optionally shaded to decrease overall environmental brightness (luminance) exceeding a tolerance level that may be set by the user and/or system.

Although regions 205 and 207 are shown to be distinct regions with hard boundaries, it is also possible for the system to create blended regions between multiple attenuation regions, or a single region and the background matrix transparency, to create a fade effect between them, or other continuous, rather than unitized treatments, or with levels or degrees of attenuation or shading matched to brightness levels of the rays passing through such that a more attenuated effect is achieved at the observation point for areas of greater brightness. Many more regions, or a single region with changing shading, attenuation or other augmentation over its area, described by such a variable function (i.e. through weighting), may also or alternatively, be implemented.

The system may assess observation point locations dynamically, by a sensor placed in front of, or nearby, in a related location (e.g., eyeglasses), and determine the angles of intersection at an observation point based on height, lateral position and distance of the observation point from both the windshield and the bright source, or both. But sensing the angles of light passing through, or projected to pass through, the windshield may also be used to create user-desired and/or system selected shading, attenuating or otherwise augmenting conditions/features, by determining that they will intersect at an observation point, the location of which may be variably set by the system or user, and may be determined by separate sensors or manual input (e.g., eye sensor, user adjustment of seat or manual adjustment of observation point location setting controls). As another example, multiple sensors, placed at known, different locations, viewing all aspects of the user's visible environment from angles triangulating or encompassing the user's viewing angles (for both eyes) may be used to identify and track all visible objects within the user's field of view, and their brightness levels, (and/or other forms of data representative of an environment) from which the appearance of those objects and brightness levels at the user's observation points are to be determined and projected, in accordance with aspects of the present invention described in this application.

Figure 3:
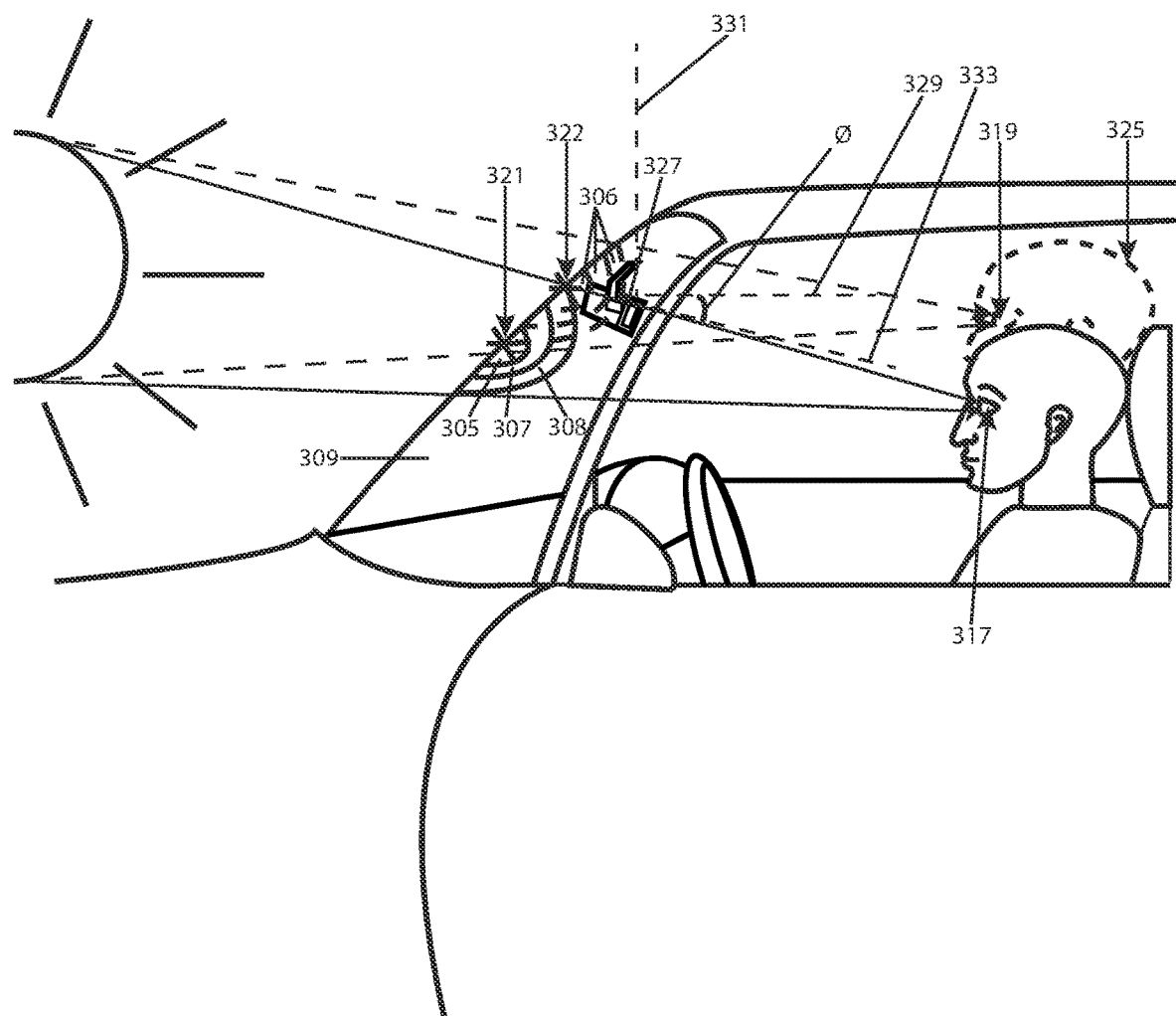
FIG. 3 depicts another side view of an operator seated in a motor vehicle, and observing an environment with the aid of hardware implementing additional aspects of the present invention.

FIG. 3 depicts another side view of an operator seated in a motor vehicle observing an environment with the aid of hardware implementing additional aspects of the present invention. With reference to this figure, aspects of the present invention addressing variable observation points, such as moving observation points 317 and 319, can be better understood. Dynamically-shaped and attributed shading, attenuating, augmenting or otherwise light-affecting conditions 305, 307 and 308 again shade, attenuate, augment or otherwise affect light passing through a windshield with variable light-attenuating capabilities 309 according to projected threshold brightness (luminance) that would otherwise occur at an observation point 317. However, in this figure, the effect of the user raising his seat, being taller in a seated position or otherwise having a higher vantage point is shown by a secondary potential viewing position, outlined as position 325, and a resulting secondary potential observation point 319. The system may automatically implement this shift in light shading/augmenting locations and condition centers, shapes and boundaries based on the change in position of a reference point, or reference points, from which the user's observation point, or range of potential observation points, may be determined by sensors determining or indicating the instantaneous location of them—e.g., glasses with location sensors, or eye location detecting sensors or scanners—and based on a change in the viewing attitude and pivoting of eyes or other observation equipment, detected by such sensors and scanners. However, in one embodiment, such sensors are not required because the user may indicate such changes by indicating eye-location through the gesture of adjusting common vehicle controls, such as rear-view mirrors, which also depend on eye level. Calibrating input devices, such as dial 327, may allow the user to adjust the center of light augmenting conditions and regions of the matrix implementing them in multiple directions on the matrix, independently of such a mirror adjustment, while nonetheless pinning further adjustments to mirror movement. In this way, if the user changes position to secondary observation position 325, and adjusts his or her rear view mirrors to a more acute vertical angle with the ceiling, angle Ø shown (between line 329, which is parallel to ceiling, and line 333, along the top of the mirror (or perpendicular to the mirror face to the observation point), an automatic adjustment of resulting conditions and the regions of the shading matrix implementing them to positions 306 can be made. Factors such as distance from the rear view mirror, which may be extrapolated or estimated by seat position or head/eye tracking (i.e. "head position" or "eye position"), may further affect the accuracy of average assumed adjustments assumed by the system to be appropriate, requiring calibrating adjustments, as with multiple axis dial controls such as 327, which may adjust condition width and amounts of regional shading, as well as shading location. Another control for calibration may further adjust the size, shading effects and shading darkness of the regions 306, to suit the user's needs and preferences. In some embodiments, a user may have a higher or lower tolerance for brightness levels than the system implements more generally, and the user may use a dial or other setting control to adjust shading levels, contrast, high-and-low brightness levels, and for different environmental conditions. Some such embodiments may actively learn a complex function describing the user's preferences over time, and according to particular events (e.g., less brightness tolerance in the early morning may be indicated by a user increasing shading, or relative shading, more greatly at that time, day after day) and implement what it has learned in new settings, which themselves may be so further adjusted. In some embodiments, different users may create different preset observation points, shading levels and any other system settings, based on their needs or preference, by programming the system. To implement those observation focal points, the user may use a preset implementing control, or the system may implement them by identifying and/or authenticating a user associated with the preset observation focal points, as well as that user's position in the vehicle or other system component. However, even in these adjustable embodiments, preferably, hard brightness limits are still implemented, to protect a user's vision from damage or permanent damage. This aspect of the invention may also be applied to a similar auditory-protection system, implementing instantaneous sound level reductions via a microphone placed closer to the sound source than the user's ear, and an actuable sound-attenuating media (e.g., with multiple, or variably enclosing actuable foam doors covering a user's ear canal.) In other words, a user's hearing in an environment can be selectively maintained, while strictly limiting and preventing damaging noise levels, in much the same way.

The system may implement, set and adjust multiple shading regions for multiple observation points, and, preferably, may affect only observation point directed light rays. Through substantial directional light filtering, these multiple shading conditions may be surgically applied, preventing or reducing the shading, attenuating or otherwise augmenting conditions and their implementing regions of the matrix affecting one observation point from being perceptible to or otherwise substantially affecting the field of vision of another observation point.

Figure 4:
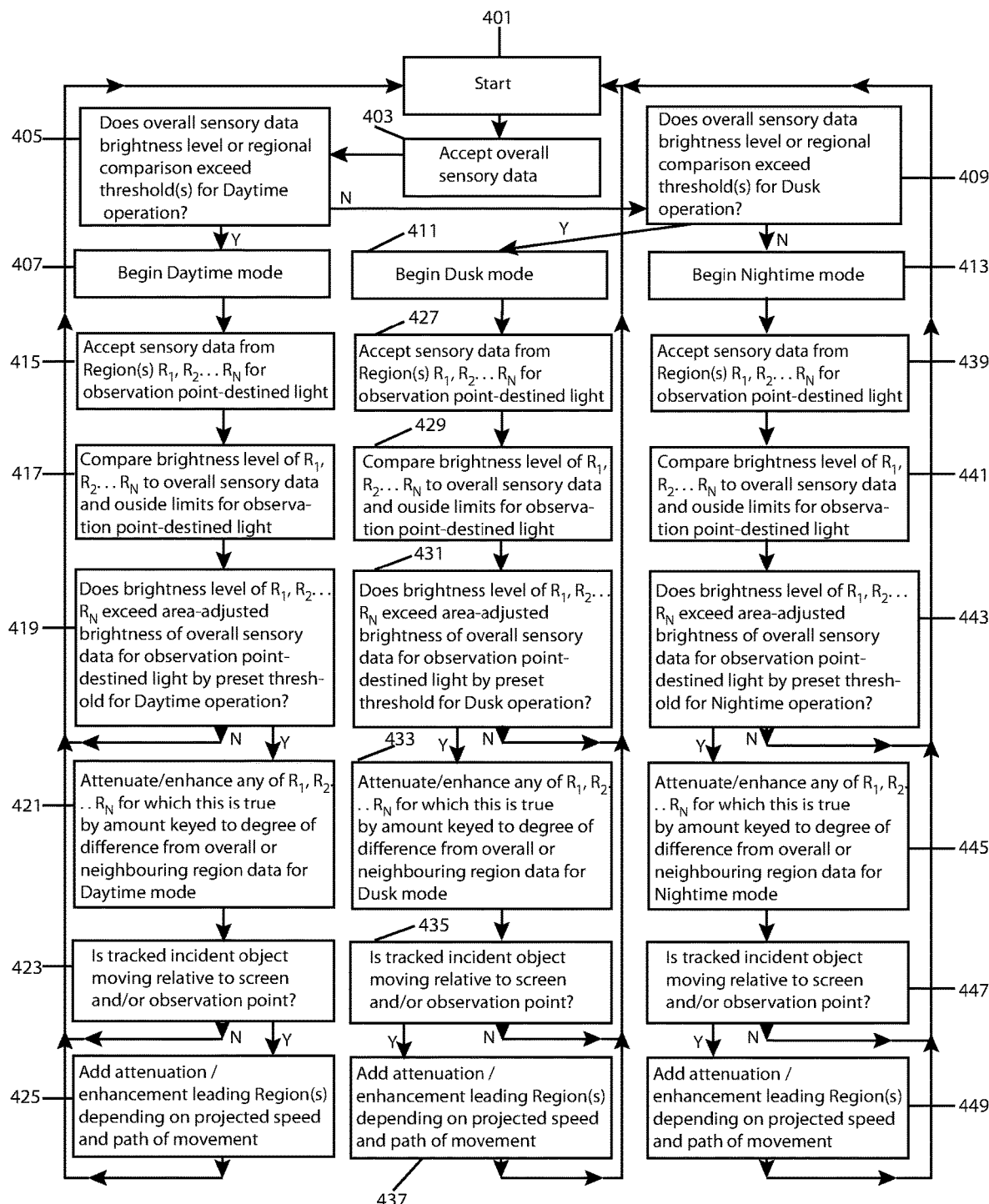
FIG. 4 is a process flow diagram for an exemplary method of implementing certain light-conditioning, -enhancing, -augmenting or otherwise -affecting aspects of the present invention.

FIG. 4 is a process flow diagram for exemplary steps 400 that may be taken by a system, such as a hardware and software system, implementing certain light conditioning, enhancing, shading, limiting, augmenting or otherwise affecting aspects of the present invention. At 401, the process begins and proceeds to step 403, in which the system accepts data input from sensors communicating overall, environmental and/or ambient light conditions surrounding the user, or within the user's field of vision (e.g., outside a vehicle and inside the vehicle where the user is seated, or simply surrounding a user and/or light augmenting or affecting matrix). If data is gathered from sensors in different environmental regions, such as a region outside of a vehicle and a region inside that vehicle, overall data (such as an average brightness level) from each region may be considered and/or compared to one another to determine different modes of operation for the system. For example, in step 405, if the ratio of average light density (brightness/luminance) from outside sensors to average light density from inside sensors is greater than a variably set or predetermined threshold below which a dusk mode or nighttime mode should be entered, the system may determine that it should enter a "daytime mode," beginning in step 407. Alternatively, a simple overall brightness level from overall environmental brightness sensor(s), rather than regional comparisons, may be taken and compared to a threshold in step 405, and, if the threshold is exceeded, the system may enter daytime operation mode in step 407. If regional comparisons are used, however, in step 405, the amount of difference between the regional measures may be used, as well as simple threshold ratio amounts, to determine a proper mode of operation. For example, if a more slight scalar difference between out-of-vehicle and inside-vehicle readings is noted, a dusk or nighttime mode or other mode for preserving light transmission and moderating attenuation (with a lower amount or area of shading, for instance, or with a later brightness level onset of shading light destined for an observation point) to retain more feature definition and contrast, under those conditions, may be used. In any event, if the system determines that overall sensory data, with or without regional comparisons, will cause the entry of a daytime mode, it initiates a daytime mode process, at step 407. If, by contrast, levels of brightness or regional comparative brightness differences are inadequate to enter daytime mode because, for example, they do not exceed the set thresholds for entering daytime mode, the system proceeds to step 409, in which overall sensory data is compared against other threshold(s) for entering an intermediate mode, such as a "dusk mode." Once again, regional brightness differences may be compared, or overall brightness data may be taken and measured against such thresholds. If such thresholds for entering a dusk mode are exceeded, the system may proceed to dusk mode operation, at step 411. If, however, such thresholds are not exceeded, the system may default to proceed to nighttime mode operation, at step 413.

Beginning with the first step in daytime mode operation, if entered, the system proceeds to step 415 after entering daytime mode. Sensors dedicated to a plurality of variable regions of a semi-transparent viewing matrix, such as an augmented glass windshield of a motor vehicle with actuably, directionally shadable regions, relay sensory data for fixed time periods or points in time to the system. Preferably, each region is equipped with at least one sensor and has the capability of individually sensing and shading or otherwise altering aspects within its volume selectively and affecting light of a selected angle of transmission and destination, to shade or augment light passing through the matrix according to whether it will intersect with a point of observation, which may be variably set by the user and/or system. Even more preferably, each region is small enough and of a substantially tessellated shape to allow total coverage of the entire matrix, and a variety of different shapes (and margins surrounding such shapes) covering any substantially observable section of the matrix. At step 415, sensory data corresponding to each region, such as those that may be labeled in a sequence of any necessary number of regions to cover the matrix (as may be expressed: $R_1$, $R_2$ through $R_N$), are passed from the sensors to the system. Preferably, these data are brightness/luminance levels per region or span of the user's field of vision for light passing through each region that will intersect with a point of observation, and adjusted and assessed based on luminance per/area at the observation point. Also preferably, these data are passed from the sensors for a given period of time, which is preferably small enough to avoid a flickering effect or other detection by a user under all usually encountered light conditions, given the human or other user/observer's persistence of vision or other viewing tolerance. In step 417, the system preferably proceeds by comparing the brightness/luminance levels of each region to overall average brightness levels from all sensors (i.e., to area-adjusted overall brightness). Next, in step 419, the system determines, for each region, whether observation point-destined light rays passing through the region have a total brightness/luminance that exceeds, by an amount exceeding a set threshold, the average area-adjusted overall brightness for the entire matrix. Alternatively, or in addition, a hard cut-off brightness level may also be included as an additional comparison threshold level. If the brightness level for a region is above such a threshold, the system then proceeds, in step 421, to shade, attenuate or enhance the observation point-destined light passing through the region, making it easier, less potentially damaging and/or painful to observe light passing through that region and through to the observation point. Preferably, the amount of shading, attenuation or other enhancement is keyed by the system according to preset appropriate levels for daytime mode, and/or (by a function describing weighting for each, in the instance of both) is keyed to brightness level of the rays attenuated/enhanced. If thresholds were not exceeded in step 419 for any region, the system may return to the starting position 401. If thresholds were exceeded in step 419, however, and if the system proceeded to shade, attenuate, or otherwise attenuate regions of the matrix, the system next proceeds to step 423 after such shading, or other attenuation or enhancement for each region for the system's cycle time interval has take place. In step 423, the system next determines if an object creating shading, attenuation or other enhancement of regions or a group of regions is moving relative to the user and/or the matrix, and tracks that movement. If so, the system proceeds, in step 425 to add additional "leading margin" shading, attenuation or other enhancement at the margins of the outer edge of such regions corresponding with the direction of movement of the object, at distances projected to block future light from the object from reaching the observation point(s) (which may be a range of possible observation points). For example, if an incident object that casts observation point-destined light rays of an intensity beyond a threshold "keyed" difference from overall brightness data for shading is determined or modeled by the system to be moving or accelerating toward the right-hand side of the vehicle, in front of the windshield, and also to the user's right-hand side, at 1 meter per second squared, a leading margin of shading may be added to intercept future light rays substantially instantaneously in the region of the windshield/matrix that will receive that future light, and in an amount of shading that may either match the remainder of the shaded region, or that may be graduated (thinning toward the edge of the direction of movement) and provide some shading to a wider area of probable intersection, based on an analysis of the probability of object movement and intersecting incident light rays, or, also optionally, based on vehicle movement command data, such as the user steering the car to the left, which would also cause the incident object to move toward the right of the vehicle. In addition, or alternatively, the shaded regions corresponding with the moving object or light source may themselves be shifted in the direction of movement at a rate determined to correspond with the likely future propagation of observation point destined light rays from the object. The system's rate of creating shading regions is preferably factored in by the system in determining the timing, size and shape of creating the shading. After creating the appropriate movement-based attenuation, shading or other enhancement for the interval handled in the operation cycle, the system returns to the starting position, 401, and again proceeds to step 403.

Optionally, and which may be preferred to save manufacturing costs, sensors may be less than one per-region, with the system creating a model of light intersecting each region, based on light density and angles emanating from the surrounding environment at the more limited locations of the sensors and based on known angle and location differences of each region from the point of the sensor and from light source objects. In fact, a single sensor may be used, but, preferably, more than one sensor is used in order to generate 3D/model information about objects in the surrounding environment. Also preferably, sensors are embedded in a structural element nearby the matrix without physically blocking the user's view through the matrix.

Turning to the dusk and nighttime modes of operation, as discussed above, if at step 405 the system determines that average overall brightness levels, or differences based on regional comparisons, do not exceed a threshold amount for entering the daytime mode, the system instead may enter a dusk mode or nighttime mode, depending on further comparisons of sensory data to predetermined action-triggering levels sensed (thresholds) determining whether to enter each of those modes, at step 409. If the threshold(s) for entering dusk mode are exceeded, the system proceeds at that point to steps 411 and then 427, or, if those thresholds are not exceeded, the system may proceed to steps 413 and 439. In either event, the system enters a series of steps similar to those discussed with respect to daytime mode, except that levels and/or rations of brightness/luminance detection thresholds for creating shading, attenuation and other dynamic enhancement features (and the amount, degree or type of shading, attenuation or other enhancement themselves) may differ significantly from those implemented in daytime mode. For example, in nighttime mode, at step 443, the system may tolerate greater differences in regional light readings, and in comparison to overall brightness levels, before creating shading, attenuation or other enhancement in regions with brighter-than-tolerated incident light destined for an observation point. Similarly, the amount or degree of shading, attenuation or other enhancement implemented may be less or change the character of the apparent object to user to make it less bothersome, yet easy to see. For example, the brightness (luminance) of the object may be shaded by less lumens or candela per area or less of a fraction of overall field of vision brightness/luminance at the observation point than with shading in daytime mode for the same brightness or relative brightness level object, or the definition of the apparent object may be enhanced, and may be shifted in spectrum to be easier to view in dark, nighttime conditions. In addition, leading margins may be eliminated or decreased in size or amount, or taper off more quickly if graduated, or otherwise may be altered to avoid blocking dim neighboring objects which would otherwise be more difficult to see at night. To a lesser degree, dusk mode thresholds and shading, attenuation or other enhancement may differ from daytime mode operation in the same way, making it an "intermediate mode." Of course, a three-mode system, such as that shown in FIG. 4, is not exhaustive of the approaches within the scope of the invention, and is purely illustrative. A much greater number, or infinite gradations, of different modes, or a 1- or 2-mode system, may also be used, and may address an infinite number of lighting, object, object movement and contrast or event conditions that the system or user seeks to specifically address by matrix regional conditions and light alteration or enhancement.

In one aspect of the present invention, light is added or replaced and may be generated from other forms of energy by the system, to propagate in the same or related directions when compared to rays of light destined for an observation point. This addition can be made selectively to observation point destined light rays emanating from identified objects (e.g., other vehicles) to brighten, label or boost contrast and of visibility of the object to a user of the system. In this way, the visible scene, and important aspects thereof, for the user may be made easier to rapidly acquire visually and mentally.

Figure 5:
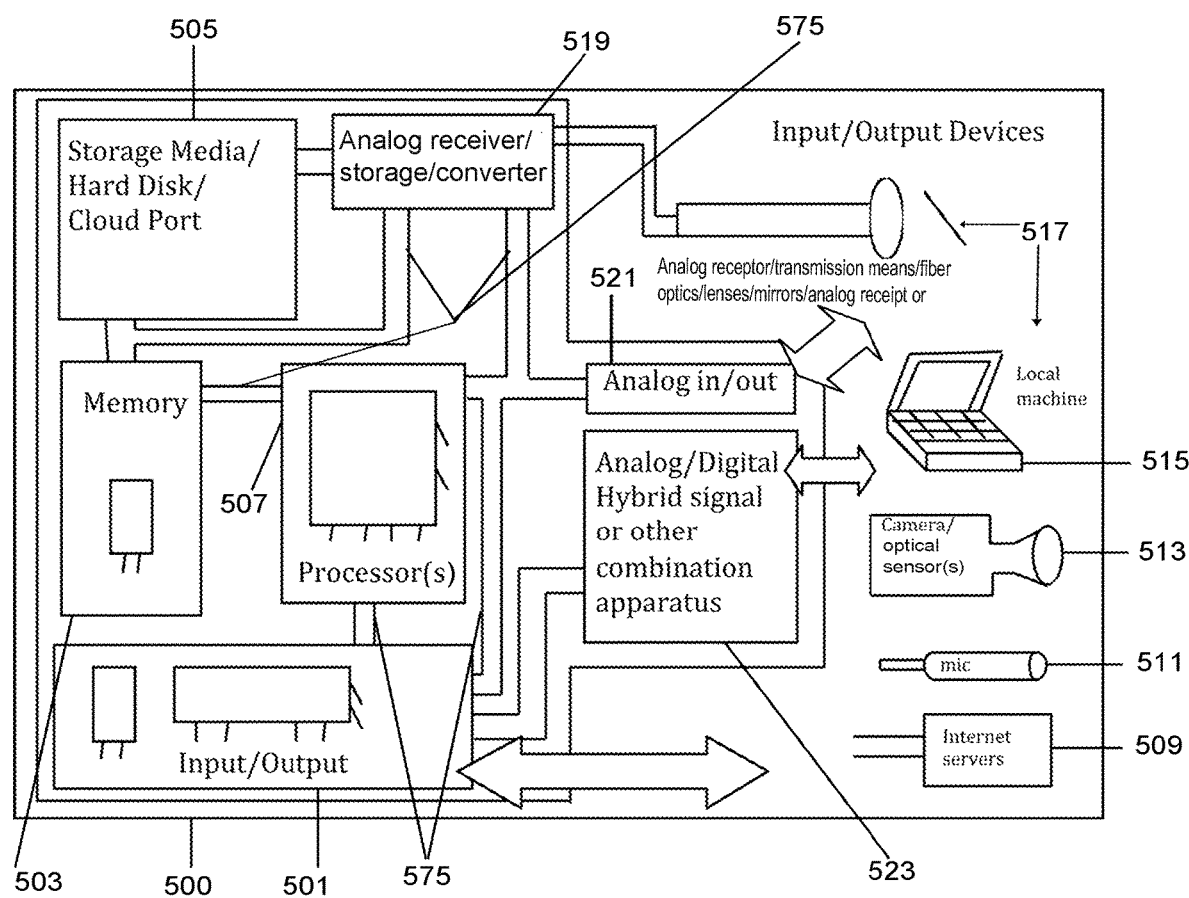
FIG. 5 is a block diagram of some elements of a system that may be used in carrying out aspects of the present invention.

FIG. 5 is a schematic block diagram of some elements of an exemplary system 500 that may be used in accordance with aspects of the present invention, such as sensing light via regional sensors, creating shading, attenuating or other enhancing conditions in a semi-transparent matrix, running a touch-actuable matrix and multiple directable light sources, and managing camera shake and other undesired optic movements. The generic and other components and aspects described are not exhaustive of the many different systems and variations, including a number of possible hardware aspects and machine-readable media that might be used, in accordance with the present invention. Rather, the system 500 is described here to make clear how aspects may be implemented. Among other components, the system 500 includes an input/output device 501, a memory device 503, storage media and/or hard disk recorder and/or cloud storage port or connection device 505, and a processor or processors 507. The processor(s) 507 is (are) capable of receiving, interpreting, processing and manipulating signals and executing instructions for further processing and for output, pre-output or storage in and outside of the system. The processor(s) 507 may be general or multipurpose, single- or multi-threaded, and may have a single core or several processor cores, including microprocessors. Among other things, the processor(s) 507 is/are capable of processing signals and instructions for the input/output device 501, analog receiver/storage/converter device 519, and/or analog in/out device 521, to cause a display, light-affecting apparatus and/or other user interface with active physical controls to be provided for use by a user on hardware, such as a personal computer monitor (including, but not limited to, digital camera monitors or touch-actuable displays) or terminal monitor with a mouse and keyboard and presentation and input software (as in a GUI), and/or other physical controls. For example, and with particular reference to the aspects discussed in connection with FIG. 9 et seq., the system may carry out any aspects of the present invention as necessary with associated hardware and using specialized software, including, but not limited to, window presentation user interface aspects that may present a user with the option to hold or accelerate a magnetically-actuated floating lens assembly, or to turn on or bias the system toward image stabilization, which would permit the lens assembly to more freely float in space or remain aimed at an observation point, for example, with drop-down menus, selection and movement control commands (e.g., mouse with cursor or keyboard arrows or variable degree trigger switch) with different settings for each such command. As another example, with reference to FIGS. 1-8, such software may, with or without presentation of options to a user for selection on a conventional computer monitor, carry out any aspect of the invention as necessary, such as, but not limited to, identifying a reference point for an observation point, determining a range of possible or likely observation points, and implementing other user interface and processing aspects that may be used in the art, such as physics engines, physical modeling, detection, image-creation and remote control (and related software). In some embodiments, system 500 may determine observation point(s) or region(s) with eye-tracking hardware, such as 516. As shown in the figure, eye-tracking hardware 516 may include camera(s) or sensor(s) 513, among other possibilities. The processor 507 is capable of processing instructions stored in memory devices 505 and/or 503 (or ROM or RAM), and may communicate via system buses 575. Input/output device 501 is capable of input/output operations for the system, and may include any number of input and/or output hardware, such as a computer mouse, keyboard, networked or connected second computer, camera(s) or scanner(s), sensor(s), sensor/motor(s), electromagnetic actuator(s), mixing board, reel-to-reel tape recorder, external hard disk recorder, additional hardware controls and actuators, directional shading matrices, directionally actuable light sources with variable collimation and shiftable bases, additional movie and/or sound editing system or gear, speakers, external filter, amp, preamp, equalizer, computer display screen or touch screen. It is to be understood that the input and output of the system may be in any useable form, including, but not limited to, signals, data, and commands/instructions. Such a display device or unit and other input/output devices could implement a user interface created by machine-readable means, such as software, permitting the user to carry out the user settings, commands and input discussed in this application. 501, 503, 505, 507, 519, 521 and 523 are connected and able to communicate communications, transmissions and instructions via system busses 575. Storage media and/or hard disk recorder and/or cloud storage port or connection device 505 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive. Generally speaking, the system may be implemented as a client/server arrangement, where features of the invention are performed on a remote server, networked to the client and made a client and server by software on both the client computer and server computer.

Input and output devices may deliver their input and receive output by any known means of communicating and/or transmitting communications, signals, commands and/or data input/output, including, but not limited to, the examples shown as 517. Any phenomenon that may be sensed may be managed, manipulated and distributed may be taken or converted as input or output through any sensor or carrier known in the art. In addition, directly carried elements (for example a light stream taken by fiber optics from a view of a scene) may be directly managed, manipulated and distributed in whole or in part to enhance output, and whole ambient light information for an environmental region may be taken by a series of sensors dedicated to angles of detection, or an omnidirectional sensor or series of sensors which record direction as well as the presence of photons recorded, and may exclude the need for lenses or point sensors (or ignore or re-purpose sensors "out of focal plane" for detecting bokeh information or enhancing resolution as focal lengths and apertures are selected), only later to be analyzed and rendered into focal planes or fields of a user's choice through the system. For example, a series of metallic sensor plates that resonate with photons propagating in particular directions would also be capable of being recorded with directional information, in addition to other, more ordinary light data recorded by sensors. While this example is illustrative, it is understood that any form of electromagnetism, compression wave or other sensory phenomenon may include such sensory directional and 3D location information, which may also be made possible by multiple locations of sensing, preferably, in a similar, if not identical, time frame. The system may condition, select all or part of, alter and/or generate composites from all or part of such direct or analog image transmissions, and may combine them with other forms of image data, such as digital image files, if such direct or data encoded sources are used. Specialized sensors for regions of a pass-through matrix, such as a regionally-shadable windshield, sensors detecting the location of objects to be focused on or yielding observation point destined light, and sensors selecting points of reference to be tracked in a sensed and/or photographed scene and sensors capturing the forces applied to sensor/motors may also be included for input/output devices, among many other examples required according to other sections of this specification.

While the illustrated system example 500 may be helpful to understand the implementation of aspects of the invention, it is understood that any form of computer system may be used to implement many aspects of the invention—for example, a simpler computer system containing just a processor (datapath and control) for executing instructions from a memory or transmission source. The aspects or features set forth may be implemented with, and in any combination of, digital electronic circuitry, hardware, software, firmware, or in analog or direct (such as light-based or analog electronic or magnetic or direct transmission, without translation and the attendant degradation, of the image medium) circuitry or associational storage and transmission, any of which may be aided with external detail or aspect enhancing media from external hardware and software, optionally, by networked connection, such as by LAN, WAN or the many connections forming the internet. The system can be embodied in a tangibly-stored computer program, as by a machine-readable medium and propagated signal, for execution by a programmable processor. The method steps of the embodiments of the present invention may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 6:
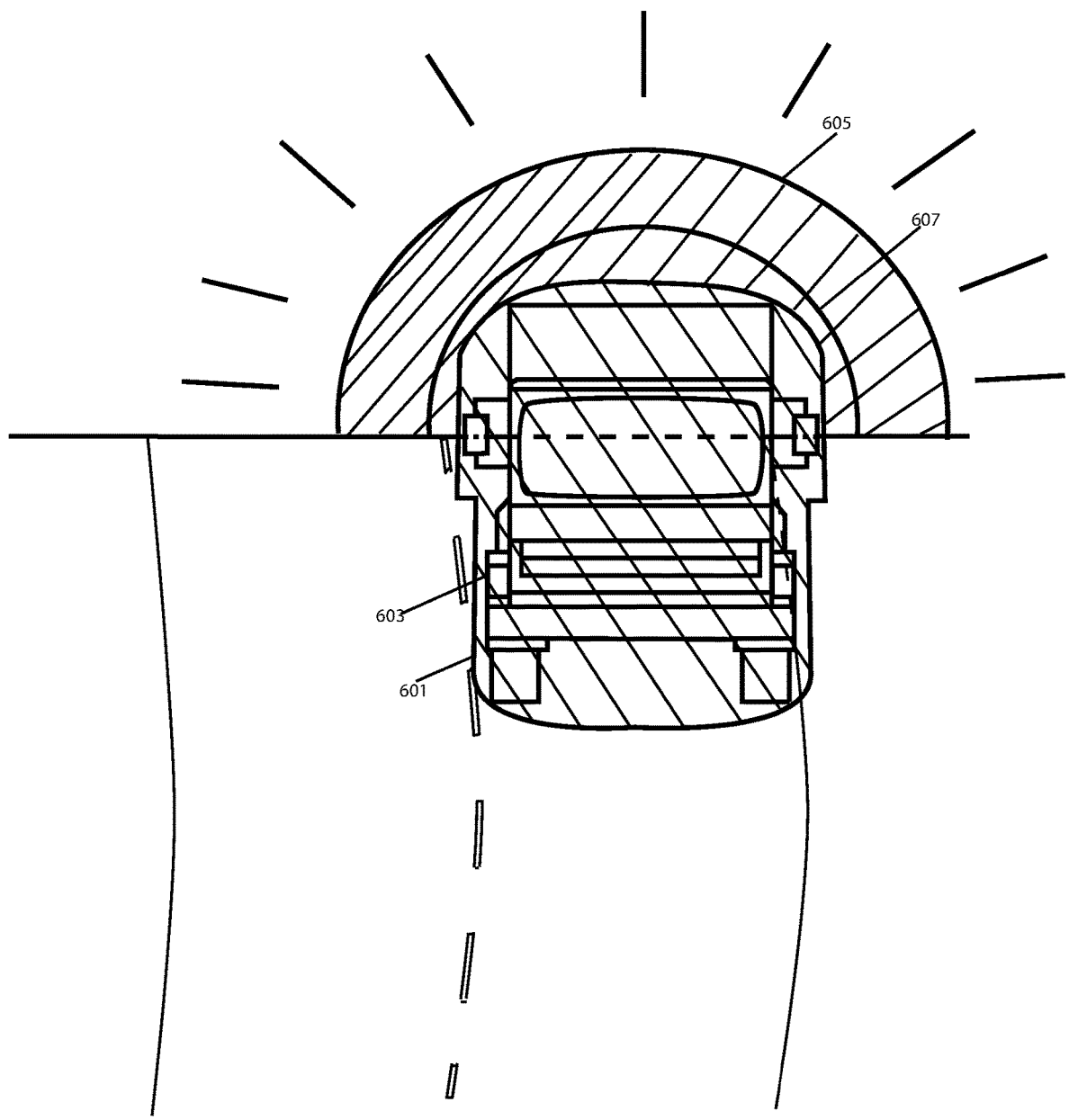
FIG. 6 depicts an environmental perspective view that a user of a system carrying out aspects of the present invention may encounter, with specialized shading and/or enhancement features designed to define, emphasize and control environmental conditions.

FIG. 6 depicts an environmental perspective view that a user of a system in accordance with aspects of the present invention may encounter, with specialized shading and/or enhancement features designed to define and control environmental conditions. As will be clear from the description herein, such shading and/or enhancement features are a form of virtual image, creating the appearance of a virtual object, in a user's field of view of a real-world environment. Therefore, the system implementing aspects of the present invention may be termed an "augmented reality device" or "augmented reality system." In this illustration, enhancement condition 601 is overlaid onto an oncoming vehicle 603 facing the viewer and the viewer's vehicle head-on, from the wrong (driver's of vehicle's left-hand) side of the road for traffic in most United States two-lane, two-directional vehicle roads. A shading or attenuation condition 605 also appears over a light source object (in this instance, the sun 607) of sufficiently great and/or differential brightness from other ambient light that would otherwise reach the observation point(s) to trigger the system to create a shading or attenuation condition/element over it, reducing glare and brightness for observation point-destined light rays passing through the medium of a windshield/matrix shadable or otherwise directionally light attenuable or enhanceable region(s), as, for example, may be accomplished by the methods discussed with reference to FIG. 4. Using system aspects as discussed with reference to FIG. 5, and elsewhere in this application, the system may identify the oncoming vehicle 603 as a collision hazard, for example, by headlight detection, range-finding sensors, motion tracking and other vehicle orientation detection methods, leading to the creation of condition 601 to alert the user. In this scenario, the system places a priority on the enhancement condition/element 601, making it visible above, and without alteration by, shading condition/element 605, for example, due to a priority order implemented by the system based on condition importance and prominence for display of classes of light enhancement or attenuation conditions using the actuable matrix. The enhancement condition 601 may have additional visibility-enhancing and alert characteristics (such as a flashing red hue (i.e., modifying a color intensity) and/or warning message, which may be accompanied by text or sound alerts) to further call out the underlying oncoming vehicle image and the potential danger the object may pose to the user. Meanwhile, the system still reduces glare and viewing damage from the bright object 607 behind the vehicle, but without interfering with the alerting methods in the region of superseding element 601. The system may determine that the oncoming vehicle poses a collision hazard for the user by any number of collision detection subsystems and physical models, in addition to assessing its presence and facing direction from an improper, oncoming lane. For example, the system may also assess the speed and projected collision time to assess adequate safety, with consideration of the user's vehicle's speed and direction. As with other aspects of the invention set forth above implementing artificial intelligence in vehicular contexts, the system may arrest or otherwise implement evasive or other cautionary measures and communications, if a user does not successfully avert the danger within a time limit, which may be system-adjusted according to the degree and probability of the danger.

Figure 7:
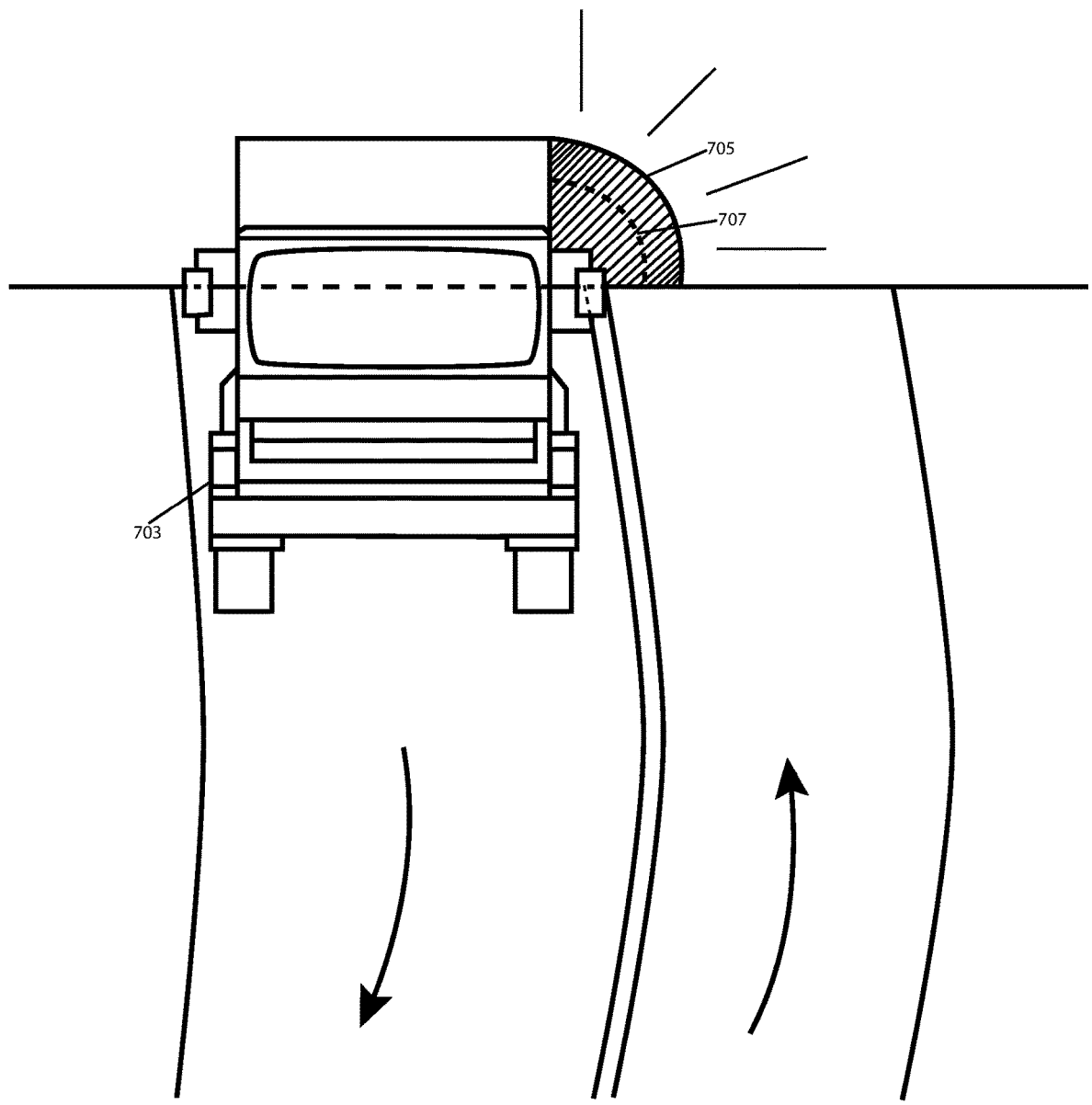
FIG. 7 depicts another environmental perspective view that a user of the system may encounter, with differences in specialized shading and/or enhancement features from features depicted in FIG. 6, to demonstrate additional aspects of the present invention.

FIG. 7 depicts another environmental perspective view that a user of a system in accordance with aspects of the present invention may encounter, with differences in specialized shading and/or enhancement conditions and features from those depicted in FIG. 6, to demonstrate additional aspects of the present invention. In this instance, an oncoming motor vehicle 703 does not cause the system to overlay an enhancement or alert feature over the motor vehicle, unlike the environmental view scenario discussed with respect to FIG. 6. Although the system may still determine that the vehicle is oncoming, as a general matter, it may employ a physical model and rule system that determines that a collision between the motor vehicle and the user's motor vehicle is too unlikely to trigger an alert, given the nuisance that frequent false alerts would pose. Alternatively, a more subdued, smaller, or less intense warning overlay region may be, but need not be, employed to call out the presence of the oncoming vehicle, which, as with each subfeature of the invention, may be system- or user-adjustable or system- or user-determined. More specifically with respect to the physical model and system determination that too low a threat exists to create an alert of the nature discussed in FIG. 6: the system may through vehicle traffic lane detection or information and vehicle location detection or information determine that the oncoming vehicle is in a correct lane which, if continued to be followed, will not result in a collision—even if the turn in the road might yield simpler physical models to incorrectly project a potential collision based on instantaneous velocities without the benefit of such detection and information. The system may also withhold warnings based on such collision/intercept velocities if the vehicle accelerations indicate correction that will not yield a collision, even if the oncoming vehicle is initially momentarily in the wrong lane, for example, at too great a distance away to create an alert. A shading or attenuation condition 705 covers just the visible parts of the bright object 707. An additional enhancement region (not pictured) may reduce or replace a halo effect from the bordering region of the bright source 707.

Figure 8:
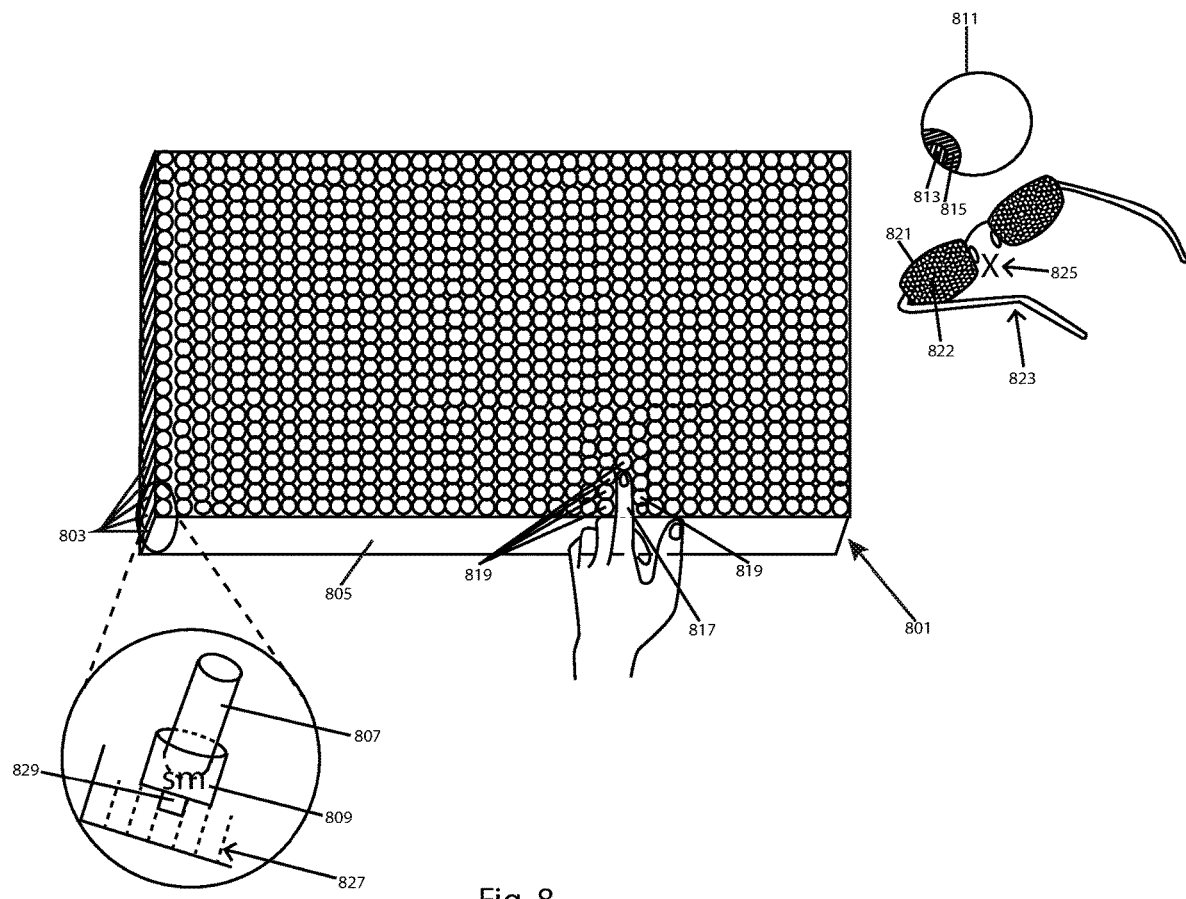
FIG. 8 depicts an interactive touch-actuable optical matrix and optional additional viewing apparatus, as may be used in accordance with aspects of the present invention.

FIG. 8 depicts a perspective view of an interactive touch-actuable viewing display and matrix 801 comprising light sources and an optional auxiliary viewing apparatus (specialized glasses 823) (a type of "augmented reality headset" "augmented reality glasses," or "headset" or "glasses," for short), as may be used in accordance with aspects of the present invention. The viewing matrix 801 comprises a plurality of angle-directable and base location-shiftable, variably-collimated light source units, such as those examples shown as 803. While a containing mounting frame and platform 805 may house and provide support and a structure for movement (using, for example, actuators) for the bottom and lateral sides of directable light source units such as 803, part of the left-hand side of that mounting 805 is not included in the figure, in order to aid in visualizing the 3D composition of those light source units 803. Each light source unit 803 comprises a directable light-producing and variable focus lensing unit 807, embedded in a pivoting sensor/motor actuator 809, allowing the system to produce and direct light rays of varying collimation, emanating generally or specifically (depending on the selected, system or user-variable degree of light collimation) in the direction of the length of the cylindrical light-producing/lensing unit 807 body. As explained in greater detail below, by changing the angles and collimation of each unit 807 to deliver pulses of sufficient duration at necessary angles to create a varying perspective impression for different viewing locations and perspectives from eye movements, for example, using the sensor/motors 809, in pulsed durations and source location spacing that maintains the appearance of an image due to the human persistence of vision and focal abilities, the system may both create three-dimensional images of virtual objects of varying depths in a user's potential field of vision and may reduce or even substantially hide the presence of objects between the matrix and the observation point (typically, a human eye) 811, at the pupil 813 (shown within an iris 815) with a final destination of a retina (not pictured). Preferably, light ray angles to place image-generating light at all possible rotational positions and positional shifts of an eye or retina as the observation point are produced, or can be produced upon detecting the occurrence of those shifts and points by eye position and orientation tracking, by the matrix 801, and the system produces different images corresponding with different perspectives and orientations that would result from such actual or possible eye rotation and shift matched by a facing and opposing unit 807 position, corresponding with those additional angles and positions to create the appearance of the common virtual object regardless of changing eye position and orientation. Using this technology, 3D perception is greatly aided over what is ordinarily possible with separate image information for each eye only, as is done in 3D photography, stereography and viewing techniques. To further explicate: First, the distance of a virtual object projected by the matrix may be varied almost infinitely by adjusting the angle and degree of collimation of efferent light from each light source 803 to produce the image of a viewable object. By reducing collimation to scatter light at a variety of angles and by simultaneously directing each lensing unit 807 perpendicularly from the length and width of the back of the mounting, a simple two-dimensional picture may be created. However, some or all units 803 may instead be used to create at least one virtual 3D object image for a viewing point, such as pupil 813 or the retina of eye 811, which object may have a nearly infinite variety of possible apparent distances from the user, at the election of the system, for example, according to the requirements of displayed media recorded from camera sensors recording (or recording systems extrapolating) light angle and source position object information for a variety of corresponding viewing angles and position shifts from a recording format including those parameters. This may be accomplished by several of the units such as 807 directing more collimated, or narrower divergently (or convergently in front of the observation point from reversed sides, to create the appearance of an object in front of the matrix) angled light corresponding with the object's efferent light profile for the viewing point, from angles more acute than perpendicular (which angles depend on the distance and size of the object sought to be simulated) and toward all possible or likely shifted and rotated positions for an eye and retina, with virtual object information corresponding with those angles and positional shifts. The closer to perpendicular from the length and width of the mounting bracket source units 803 are, the further away an object will appear, until an infinite focal length is attained, caused by substantially parallel emanating light rays. To simulate an adequate 3D virtual object for multiple viewers and/or multiple eyes of one viewer (simultaneously reinforcing the 3D effect more strongly, due to two eyes with varying angles greatly increasing depth perception) some units may target one eye or viewer with more collimated light, preventing interference with the other eye or viewer, while other units target the other eye or viewer, with virtual object light angles and source positions corrected in perspective for each eye's position. Alternatively, or in conjunction, units may pulse light rays targeting one eye or viewer and then shift to pulse light rays targeting the other eye or viewer, in sufficient frequency and duration to avoid perception by the viewer, due to the persistence of vision effect (exploited in multiple frame cinema). In still other embodiments, the system may cause light interference of more diffuse light emissions from units 803 to create new, resultant light beams at the viewing points. In this way, the appearance of virtual object images can be built in front of objects in between viewer and the screen. Objects even closer to the viewer than the matrix may also be simulated by more acute light ray angles (which, as noted above, may result from reversed-sided light-carried information relative to light-carried information from units corresponding with images further away, beyond the matrix from the viewer) and, if enough light is used, virtual objects of any distance, and particularly, closer distances, may be used to overwhelm the appearance of other objects in between the matrix and the viewer, causing them to be effectively hidden and appear to disappear. For example, in the context of a matrix in accordance with the present invention that is also a touch screen, a user may use his or her finger 817 to touch-actuate the screen. However, the user's finger 817 need not block the user's view of the screen (as it does in conventional touch screens) if surrounding units, such as units 819, adjust their collimation and shift their angles and positions to pulse light of sufficient duration to substantially replace light from the units otherwise hidden beneath the user's finger 819. This is especially effective in instances where objects of a substantially different apparent distance than the user's finger are used, because the user's eye and/or eyeglass lens will naturally blur and scatter competing light from the user's finger or stylus. However, specialized lenses, such as those depicted as 821, with sub-component lenses 822 of varying focal lengths can be used to exaggerate that difference, and more effectively replace image data from behind a hiding object, such as a user's finger. Certain of the subcomponent lenses 822 may be oriented and have the proper focus to create the impression of virtual objects from source units 803 that are not, in fact, sending light from those angles but, due to the refraction of those sub-component lenses, appear to be. Meanwhile, other subcomponent lenses 822 may have a focal length that exaggerates the apparent difference in distance from an intervening object and the location of the virtual objects generated by the matrix, even in the event that a flat screen effect is being created by the matrix. Together, these aspects further scatter competing light from interfering objects and fully replace light of the correct angle and apparent source for light blocked by interfering objects. Light source units 803 must have dynamic, highly accurate targeting abilities, and the system must track the orientation and location of the auxiliary viewing apparatus 823, and be further programmed with locational information for each type of lens subcomponent 822, to carry out aspects of the invention discussed above. It is preferred that each of the lenses of the auxiliary apparatus absorb or scatter light from the angle of departure from the location of interfering objects (e.g., up to 0.5 inches in front of the matrix) and/or reflect or block it out of view of the viewer's eye. Compound lens subcomponents 822 that adjust focal lengths according to orientation of each lens sub-component may be necessary to carry out these aspects. Positional shifts of light source units 803 may be managed by structural actuable tracking components 827, which the base of units 803 may move along in any direction along the mounting 805 floor and/or walls, with the aid of a fitting member 829 on each unit 803.

Although an array of micro-lenses and units 803 are illustrated on glasses apparatus 823, it should be understood that a wide variety of lens arrays and types may be used, in addition to other light manipulation devices. For example, in one embodiment, beamed light with embedded subcomponents suited to the orientation of apparatus 823 may be received by a beam-splitting lens array, which then spreads different components of the beam across a visible screen of apparatus 823, creating a viewable image appropriate to the viewing orientation of the apparatus 823 and user. A trackable location and orientation-indicating tag on apparatus 823 may aid the system in defining and directing the beam into such beam-splitting lens array, to create the image of the appropriate perspective. In that embodiment, a light amplifier may also be used in apparatus 823, or a broad-spectrum beam may be narrowed at the apparatus, to avoid the need for a dangerously high-energy beam.

Figure 9:
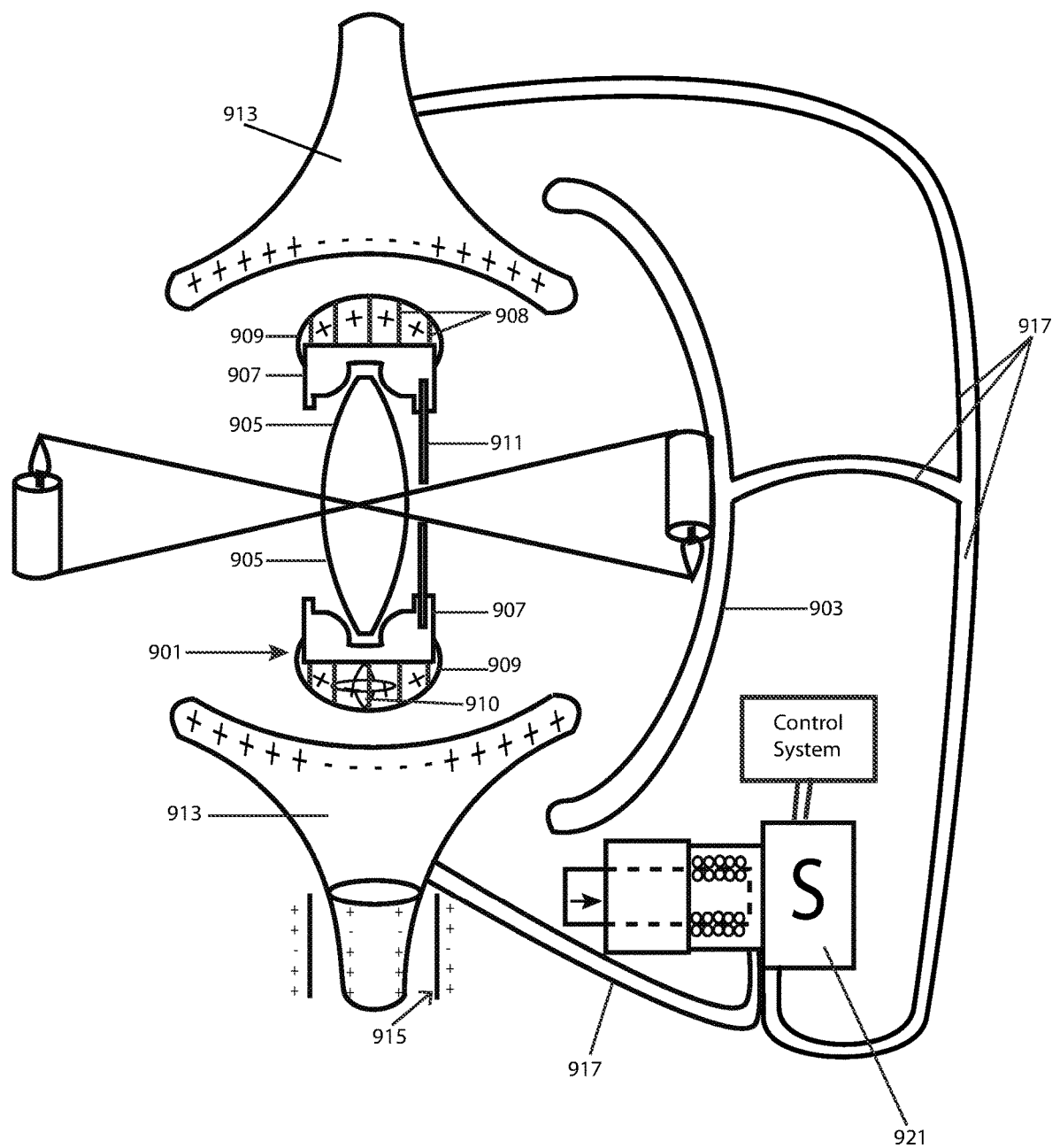
FIG. 9 depicts sensor and camera motion management hardware of a system implementing aspects of the present invention, including a variably-actuated floating lens mounting and curved, oversized variable image capturing zone sensor.

FIG. 9 depicts a cutaway side view of a sensor and camera motion management hardware of a system implementing aspects of the present invention, including a variably-actuated floating lens mounting 901 and curved oversized variable active zone sensor 903. A bi-convex converging lens 905 is seated in a lens bracket 907 with system- and/or user-variable, zoned electro-magnetic charge carrying attachments 909. As will be explained in greater detail below, individually chargeable zones, such as those shown as 908 of the attachments 909 permit the system to create magnetic and/or electrostatic holding and actuating forces with the use of variable actuators to accelerate and cause or cease the rotation of the lens assembly relative to the remainder of the system. Gyros, such as 910, may variably (applied when acceleration of the lens by the system is not sought) aid in stabilizing the lens/bracket assembly in space. Also mounted to bracket 907 are variable, actuable aperture controlling louvers 911, which limit the width and amount of light entering the camera/sensor hardware and, ultimately, landing on the sensor 903. The sensor 903 is shown to be curved such that, as lens 905 may rotate within an overall camera housing (not pictured) and relative to compatible zoned electromagnetic external actuator(s) 913, a focused image may still be captured on the sensor, albeit in a different, or even moving, expanse of the sensor 903 than before such rotation. Full rotation of the rotating lens/bracket assembly 901 such that image-forming light moves out of the sensor's range can be prevented by graduated rotation resisting force, implemented by the system, which may gradually create increasingly attractive, opposing accelerating charges in the charge carrying attachments 909 and nearby regions of the actuators 913. But the system and/or user may also use physical, such as retractable/extendable structural members, with or without force loading, to decelerate or arrest undesired lens movement, and, when floating lens aspects are not in use, to lock lens mounting 901 relative to the camera housing and/or sensor. In the instance of motion picture photography, the system may also follow and track rotation and other movement of the lens relative to the outside environment and momentarily arrest and then resume lens rotation and movement (including placing it into its correct position based on the previously projected rotation of the camera that would otherwise occur) to allow for a fixed image for the instance of recording on the sensor, avoiding motion blur, while maintaining a steady pan. Alternatively, motion blur can be corrected automatically by the system by tracking and interposing information from leading pixel/sensors outside of the image size, accepting light later the initial impression of light creating and image and determining shifted image data based on that advanced distance, and combining shifted or new pixel data with data from previously leading pixels and deleting that data from the actually recorded positions.

Preferably, the sensor 903 and the external lens actuator(s) 913 are connected structurally and weight-balanced, such that the mounting point for the actuator(s) serves as a fulcrum between them. In this way, less electromagnetic force is required to offset levered force that would occur between the external actuators and their own variable electromagnetic floating mount(s) actuator(s) 915.

The system may determine which region of the sensor 903 is considered active, and from which to accept and store image data, based on sensors indicating the rotational position of the lens, and then inferring the region which may accept light from the lens based on that rotation. Alternatively, the system may determine active regions on the sensor simply by the regions of light being sensed on the sensor 903, although dark conditions may limit the utility of that approach because no ambient light may be present for some regions of the sensor that should be dedicated to the image. In that instance, the system may select a variety of cropping options to the user, in specialized image file, to allow any composition chosen by the user. Communicating leads 917 permit computer or machine logic components (such as a computer system, like the system discussed with respect to FIG. 5) to actuate actuators 915 and 913, and apply force to lens 905, which may be graduated and user-selectably graduated, as with a multiple degree of depression sensing trigger or switch 921. In this way, a user holding a camera housing connected to actuators 915 and 913 and sensor 903 could gradually apply a force to the lens 905 to alter, accelerate, decelerate or arrest its rotation relative to the actuator(s) 915 and 913, sensor 903 and, more generally, their housing (not pictured).

Vertical or lateral shake can be avoided by the system by actuating additional chargeable regions of the floating mount actuator(s) 915, which may apply magnetic and/or electrostatic force to chargeable zones of the actuator 913. While generally similar charges lead the actuator to float, opposing, attractive charges at some paired locations may allow the system to hold, buffer or accelerate the actuators, according to user or system commands. For instance, if accelerometers indicate that the overall camera housing is initiating a vertical shake, and the user has commanded the system to "float" freely, without shake, the system may remove those opposing locking charges and initiate new opposing charges to accelerate the actuators (and the actuated lens) to move the peripheral components to the lens with the motion of the shake, and/or move the lens counter to the motion of the shake. Such commands may be made by varying degrees, using a variable degree input, such as a gradated trigger/sensor/switch like 921. Although, due to the cut-away nature of FIG. 4, it appears that the bottom of the actuator(s) 913 and its floating mount to the housing 915 are generally cylindrical, permitting only up and down movement, the actuator instead may be a single disk edge-shaped flange extending into a ring-shaped trench of the floating mount 915, controlling any lateral or vertical shake, and combinations thereof. Additional actuators (not pictured) using the same counter-motion systems may buffer shake in the fore and aft directions relative to the housing. Actuators, hardware input devices, and sensors of the system may communicate with one another and a control system, such as that discussed with reference to FIG. 5, via communication busses 917.

Figure 10:
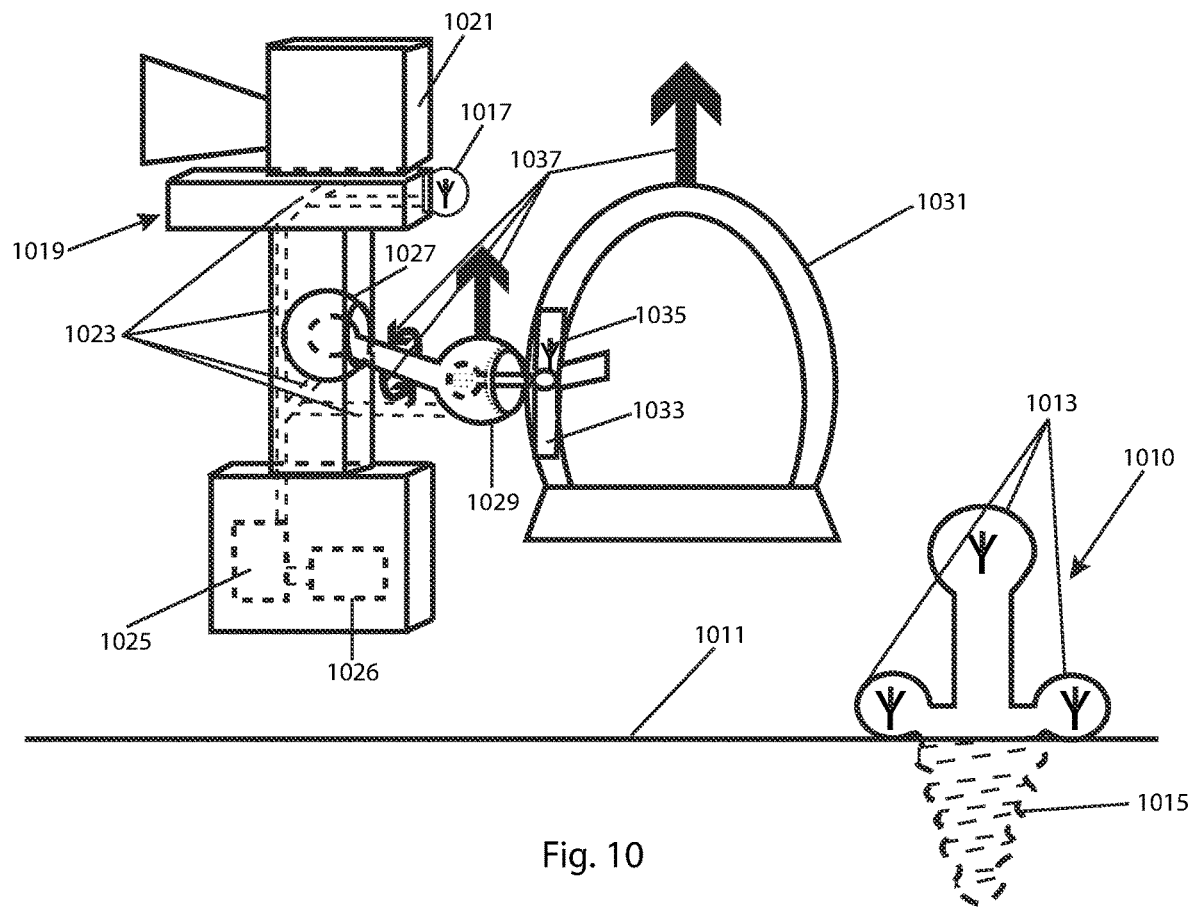
FIG. 10 depicts additional sensor and camera motion management hardware of a system implementing aspects of the present invention, including local elevation and movement-indicating and response aspects.

FIG. 10 depicts additional sensor and camera motion management hardware of an exemplary system implementing aspects of the present invention, including a local elevation and movement-indicating beacon 1010, fixed into a ground or floor 1011. The movement-indicating beacon 1010 comprises multiple transmitting points 1013, at least some of which are located at different vertical and horizontal positions and transmit separately-identifiable, distance-indicating signals to the system, such that any movement in any direction relative to the beacon can be tracked and responded to by the system. An anchor section 1015 (which may include progressive threading, as pictured) permits pinning the beacon 1010 into a fixed (or desired to be tracked) background element, such as the ground or floor 1011. By receiving and/or transmitting distance-indicating signals over time, the transmitting points 1013 may indicate to the system, through, for example, RF antenna unit 1017, the initial and change in position of a sensor/camera support unit 1019, on which the sensor/camera 1021 is mounted. By communicating with elements of the sensor/camera 1021, lens assembly (not pictured in this figure) and RF antenna unit 1017 with leads/busses 1023, the computer system (such as a system similar to the one discussed with reference to FIG. 5) 1025, connected with and powered by a battery unit 1026, may aid in stabilizing the sensor/camera support unit 1019 by actuating and/or applying stabilizing force using electromagnetic stabilizer/actuators 1027 and 1029, in conjunction with a shoulder-mounted harness 1031 with torso-mounting bracket 1033. In addition to using free-floating isolation methods discussed with respect to FIG. 9, the system may stabilize the sensor/camera support unit 1019 by permitting the shoulder-mounted harness 1031 (which may alternatively be any form of harness or handle) to move in any direction and by any amount without applying direct force to the sensor/camera support unit. More specifically, the system detects and counters instantaneous movement of the shoulder-mounted harness (for instance, by location and/or movement data receipt/transmission of a mount beacon 1035 relative to each/any the movement indicating beacon 1010 and/or to the mount RF antenna unit 1017), from which movement information the location and additional force that would be instantaneously applied to stabilizer actuators 1027 and 1029 may be inferred by the system—preferably, detecting motions that lead with a mount beacon 1035 movement relative to the movement indicating beacon 1010, and countering them specifically or more aggressively than other movements with actuator movements that move with the direction of force. Instead of permitting the shoulder-mounted harness 1031, or a similarly-mounted and buffered operator handle (not pictured), to apply direct additional force (other than to counteract gravity or centrifugal forces, which may be detected separately by accelerometers in the camera mount 1019 as progressing from the gravitational direction to cause the camera mount to turn, and countered smoothly) the system may instead allow and assist both stabilizer actuator 1027 and 1029 joints to rotate, and provide the harness with freedom to move by moving an intermediate armature, which is actuated by both stabilizer actuators, while not moving mount 1019. Such a non-direct force transmitting movement, and reaction by the system, is shown by force arrows 1037. To allow a smoothly-applied redirecting force to be applied, the user may indicate that the system "follow" the relocation of the harness or handle by a degree of rapidness and closeness to the actual movements, or by movement progressions and functions, which may be variably set by the user. For instance, the system may apply a gradually, progressively increasing force in the same direction that the user has moved the harness, and a deceleration force that is also smooth and gradual, to permit a resting point that is the same relative to the shoulder harness as the beginning point, before the movement of the harness. Progressive functions that the system may apply may include force concentrations in different ranges of movement, and such functions may include, also as variably selectable by the user and system, restriction to movement in particular planes (e.g., "horizontal pan, faster acceleration curve in the first 30 degrees of harness pivot") while preventing movement in other planes or lines (e.g., "fixed camera altitude"). The stabilizer actuator 1027 and 1029 may also be used by the system to resist and smooth out movements from external insult (e.g., nudging or panning the camera mount by hand) by similar counter movements and force biasing or smoothing functions.

Figure 11:
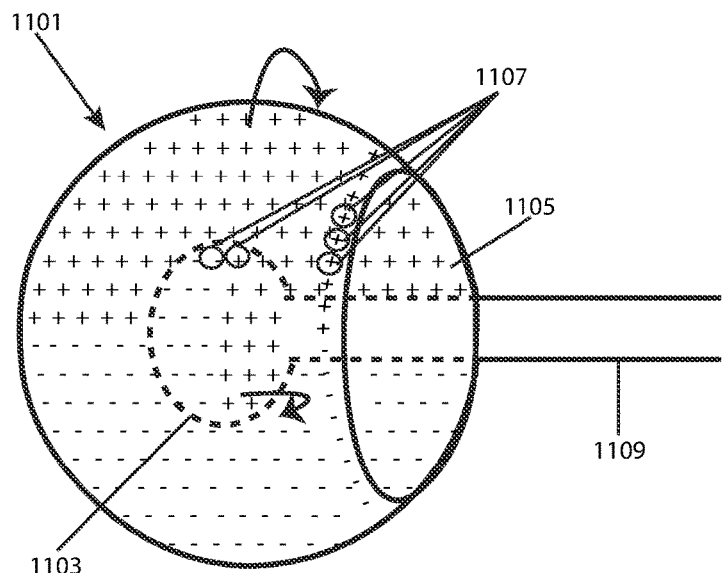
FIG. 11 depicts a potential electromagnetic stabilizer/actuator joint, as may be implemented in aspects of the present invention and, in particular, in the system discussed with respect to FIG. 10.

Turning to FIG. 11, certain additional aspects of the present invention involving potential forms of actuators 1027 and 1029 may be better understood. Generally, an actuator 1101 with a ball element 1103 and socket element 1105 is provided. Unlike with traditional ball-and-socket joints, however, 1101 may limit or avoid physical contact between the surfaces of the ball element 1103 and socket element 1105 by electromagnetic forces, which are sufficient to hold the ball element 1103 generally within the center of the socket element 1105. But contact, lubricants and ball bearing structures may alternatively be used. More specifically, separately chargeable regions, such as 1107, of both the ball element 1103 and the socket element 1105 may be variably electrically and magnetically charged to repel (or, as discussed in greater detail below, in particular regions to repel and attract) one another for both stability and applying rotational force to an attached lever 1109. One form of stabilization and actuation may be accomplished by rotating rotatable sphere aspects of either or both the ball element and the socket element (if provided with a rotatable axis where connected with other structural elements to which they are attached). By using a dipole of charges in both the ball element and the socket element, as shown (although the charge of the inner sphere of the 1103 sphere is shown and the charge of the outer sphere 1105 is not shown in the area where the two both appear in the figure, for clarity), and spinning them rapidly enough relative to one another, the resulting rapidly oppositely applied forces create a substantially fixed, stable hold between the two elements of the joint. Furthermore, by selectively slowing and accelerating the rotations at points to increase a particular direction of applied force, while increasing speed (and therefore, decreasing force), on the opposing side of the rotation, a force may be applied for a desired rotational direction and amount, or a function of directions and amounts, to cause actuation of the joint in any direction or functional complex of directions. By choosing more charge-bearing actuable units on the entirety of one side, as well as higher levels of charge, or less charge only toward the end of the side of the dipole, and differing rotational speeds, accelerations and decelerations, a wide variety of force gradations are possible. Rather than spinning fixed or fixed types of charges, charges may be simply altered in patterns to cause actuation as well, in fixed physical spheres for both the ball and socket components.

Figure 12:
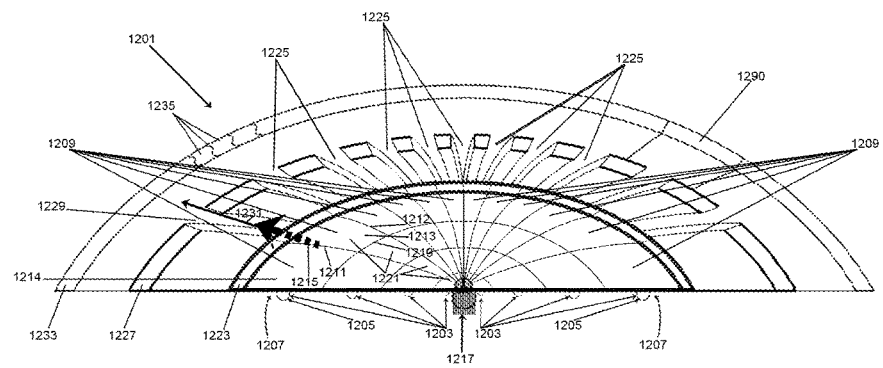
FIG. 12 depicts an exemplary individual pixel device for a display in accordance with aspects of the present invention.

FIG. 12 is a side view cross-section depicting an exemplary pixel device 1201 for a display in accordance with aspects of the present invention. An array of several such pixel units 1201, for example mounted on and spread across a surface of a display, is useful for producing 3D images with or without the use of stereoscopic glasses. Pixel device 1201 may be mounted is such a display by soldering or otherwise electrically connecting and welding individually-activatable contacts 1203 into ports within such a display, and which ports also comprise contacts (not pictured) that are electrically connected to contacts 1203 when pixel 1201 is so mounted. It should be understood that the pixel appears to be generally shaped as a half-dome for demonstrative purposes in the figure, but will be a full dome, in practice. As a result, twice the number of mounting contacts pictured will be present (in an array that is a mirror image, out-of the page, from that shown), but half are omitted due to the cross-sectional nature of the figure. Thus, A control system, such as control system 500, discussed above, may address and provide power to each contact 1203, and the mirror image contacts not pictured, through system-switchable electrical connections. Exemplary contacts 1205 are the visible pair of contacts closest to the viewer—thus, appearing larger than others of contacts 1203—and each contact 1205 addresses the same curved row 1207 of semiconductor units 1209. Preferably, contacts 1205 are of an opposing polarity relative to one another and, when addressed and supplied with power by a control system, receive current via contacts connected to them when pixel 1201 is mounted in a display—completing a circuit. Junctions, such as example 1211, between semiconductor units, such as examples 1209, allow for variable bridging and transmission of charge in the circuit between one semiconductor unit, such as 1213, and its abutting neighbor unit, 1214, across them. The bridging and transmission that may occur at the junctions is variable in that it may occur at different levels of charge, and at voltage differentials, between the neighboring semiconductor units defining the junction between them. For example, semiconductor unit 1213 may be loaded with enough charge, at a different enough level relative to its neighboring unit 1214, to cause a charge transfer across junction 1211 that yields the emission of light outward, as shown by light emission and propagation arrow 1215. However, preferably, that charge or voltage level difference, high enough to cause light emission, preferably does not occur due to the circuit created by voltages applied to contacts 1205 alone. Preferably, the voltages and current applied through contacts 1205, and the resulting circuit formed in part across row 1207, is sufficiently great to bridge the junctions between semiconductor units 1209, but at a lower charge or voltage differential, which does not yield as significant levels of emitted light or other radiation from the junctions. Instead, light is selectively emitted from any particular junction or regions or points on the dome selected by a control system, among other possible methods, by boosting the charge level of a semiconductor unit with a newly defined circuit path intersecting that semiconductor unit. For example, a multiplex contact 1217 may boost charge, and create an auxiliary circuit component through, part of any curved column of semiconductor units perpendicular to curved row 1207, through lateral, perpendicular junctions, such as exemplary junction 1219, thereby loading semiconductor unit 1213 with greater charge and relative voltage, totaling a voltage sufficient enough to yield the emission of light from junction 1211 when it is then bridged. To aid in maintaining the main circuit path across row 1207, and light emission at the selected junction 1211, and avoid erroneous alternative circuit paths, the auxiliary, boosting circuit branch discussed above, across the column of semiconductor units 1221, preferably may be supplied with the same charge or voltage as the main circuit across row 1217, and junctions perpendicular to junction 1211 may be made more difficult to bridge than junction 1211 (and other junctions in parallel arrangement with it), and just enough voltage to bridge the minimum number of perpendicular units to reach unit 1213 from multiplex 1217 may be applied. However, in other embodiments, all junctions are equally resistant or difficult to bridge, leading the minimum distance in units to join and complete the lateral circuit addition from multiplex 1217 (i.e., the path of least resistance) as the main factor driving the circuit created across the semiconductor units. In this way, by powering and creating a circuit across a particular row of semiconductor units, such as row 1207 or any row parallel to that row, and by simultaneously powering and creating a circuit across a particular column of semiconductor units perpendicular to that row, such as column 1221, a particular junction, such as 1211, and just that junction, can be subjected to a sufficient voltage or charge differential to yield the creation of light when the junction is bridged by the resulting multi-branch circuit.

The embodiment discussed above for selectively emitting light from junctions is exemplary only, however, and any method known or used in the art for causing light emission at a variety of selected junctions or points on a surface may, additionally or alternatively, be used to cover the surface of the dome-shaped pixel, or to otherwise form a curved or otherwise multiple-angle, instantaneously system directable pixel. For example, in an alternative embodiment, light emitting cells are arranged in the same pattern as the semiconductor units pictured, and those cells, rather than junctions, may be individually addressed by thin-film transistors (which may be transparent, for use in transparent displays or screens) to create light emanating from a particular point, region or area of the pixel. In other embodiments, electrodes rather than semiconductor materials may be used at the locations indicated for semiconductor units 1209, and additional emissive semiconductor materials may be present at the location of the junctions, such as organic materials used in OLED displays.

Because the overall array of semiconductor units, half of which are shown as quarter-dome 1223 in the cross-sectional figure, is convex (facing upward and away from a display in which device 1201 is embedded), the resulting light emission possible from the junctions covers a wide variety of possible viewing angles. It should be noted that the shape may be convex, as well, and that, as mentioned above, a wide variety of other multiple-angled emissive arrangements may, alternatively or addition, be used.

To aid in focusing light emitted from the junctions, holes or slits, such as the examples pictured as 1225, in a screening dome 1227 may be included. By filtering out more diffuse light emissions from each junction, such as 1211, each slot, such as 1229, serves to narrow and restrict a resulting efferent light beam 1231, resulting in a focused beam emanating outward at the angle selected by the control system in firing light from the junction (in this example, junction 1211). A protective, transparent or semitransparent cover 1233 may also be included, to protect pixel device 1201, and aid in mounting it on a display. In some embodiments, light-channeling and light angle altering features 1235 (such as lenses or fiber optic aspects) may be included in cover 1233, to aid in directing beam 1231 in the direction selected by the control unit, or to cover a viewing area or areas. In some embodiments, multiple angles may be selected, for multiple viewing locations, and, thereby, a junction can be selected for firing to create more than one image, for more than one viewing area. As mentioned elsewhere, cells of system-actuable, variably blocking and transparent materials may be included in some embodiments, such as exemplary nematic crystal cell 1290. As with other units, a plurality of cells such as 1290, covering the surface of cover 1233, permits creating lighting effects from a wide variety of viewing angles, but further includes altering the transparency, and shading, light passing through pixel 1201 according to a selected angle of transmission (and, therefore, viewing).

Pixel device 1201 may be used in a wide variety of display settings and, in particular, can be useful in augmented reality contexts. For example, by lining and substantially covering a windshield, glasses, or any other transparent viewing screen, with pixels 1201, with the proviso that substantially transparent electrodes, semiconductors and backing plate materials be used, an array of pixels 1201 can be used by a control system to create a wide variety of virtual objects, shading and effects, which differ according to the viewing position of the user, and these effects may be overlaid to enhance the appearance of real-world objects and create real-world contextualized content. With the use of a twisted nematic liquid crystal cells, covering the light emission regions to create varying colors, (LCD display technology), light can be shaded or left relatively unshaded, to block light from environmental objects of a brightness exceeding a threshold determined and implemented by the control system—and such objects can be shaded or unshaded for particular viewing positions and inherent observation points, while leaving other viewing positions unshaded.

Figure 13:
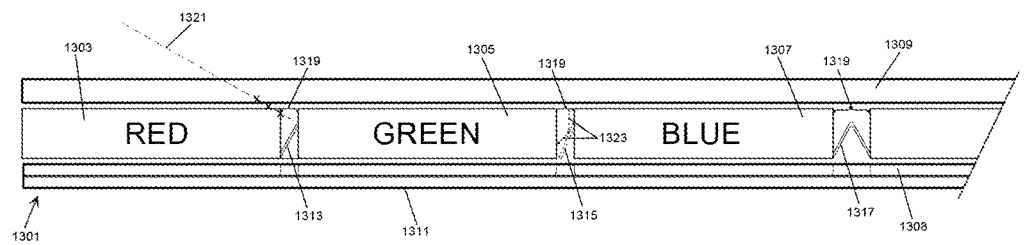
FIG. 13 is a side view depicting a pixel including a set of exemplary red, green and blue subpixel components and other surrounding display aspects, which may be incorporated in a flat panel display in accordance with aspects of the present invention.

FIG. 13 is a side view depicting a pixel 1301 including a set of exemplary red, green and blue subpixel components (1303, 1305 and 1307, respectively) and other surrounding display aspects, which may be incorporated in a flat panel display. The exact nature of the display may vary widely, encompassing any display technology, such as liquid crystal displays ("LCD"), plasma displays or organic light-emitting diode ("OLED") displays, while still incorporating aspects of the present embodiment. Generally, subpixel components 1303—1305 may appear in repeating triplets, mounted on electrode materials, such as the example shown as 1308, and below a transparent protective layer 1309. Although omitted for simplicity, it should also be understood that a transparent cathode material may also be present below protective layer 1309, depending on the nature of the display technology employed. A substrate material 1311 is also present below anode material 1308, and may be visible (or, in some embodiments, overlaid with another material that is visible) as a dark black line between the pixel sub-elements, when they are illuminated, if not for other aspects of the invention, which will be discussed below. A control system, such as control system 500, discussed above, may individually activate subpixel elements 1303—1307, varying each of their strength to emit different amounts of their labeled color, to create the appearance of virtually any color at the election of the control system at each such pixel location on a display. To reduce or remove the effects of the dark black lines between pixel sub-elements, and between pixels that are the result of necessary spacing, visible substrate or overlays, reflective inserts, such as exemplary reflective inserts 1313, 1315 and 1317, may be present between pixel subelements and pixels, to cover otherwise visible substrate materials, and in place of other masking and separating materials and spaces. Among other things, the shape, location and facets of inserts 1313—1317 pictured are selected to prevent any light entering an interstitial space 1319 between pixels and pixel sub-elements from being reflected directly back out. For example, a light ray path 1321 that would otherwise reflect directly into and back out from reflective insert 1313 (because it is perpendicular to its outer facet) is blocked in both directions by part of red pixel element 1303. In other words, in preferred embodiments, light entering the interstitial spaces 1319 becomes absorbed by materials in pixel sub-elements, and a viewer of light reflected from any of the inserts may only view reflected light originating from a pixel subelement, as shown by light transmission paths 1323, depicting such reflected light paths (each approximately 20 degrees from the outward-facing facet of insert 1315). And this remains true for any possible viewing angle from outside of protective layer 1309, of a display.

In the instance of insert 1315 specifically, the reflective facet comprises non-reflective gaps, and is more spread out vertically than that of insert 1313. However, each gap-separated component of insert 1315 maintains the same facet angle on its upper, light-reflecting surface as that featured in insert 1313, resulting in a louvered reflection completely covering the interstitial space 1319 for a viewer, and creating the appearance of an extended green pixel, 1305, without any gaps just as or nearly as well, while also permitting the entry and absorption of light in the gaps (for example, into an underlying masking material, mounting or absorbing materials). Exemplary underlying masking materials are discussed in greater detail below, in reference to FIG. 14. Thus, where some light from outside the display enters interstitial space 1319 and reflects on 1305, at least a substantial fraction of it will become absorbed elsewhere than pixel 1305, allowing the maintenance of a purer display color, despite ambient light. Insert 1317 is multi-faceted, to accommodate the greater space between pixel sub-element 1307, and aspects of a neighboring pixel element 1325.

Figure 14:
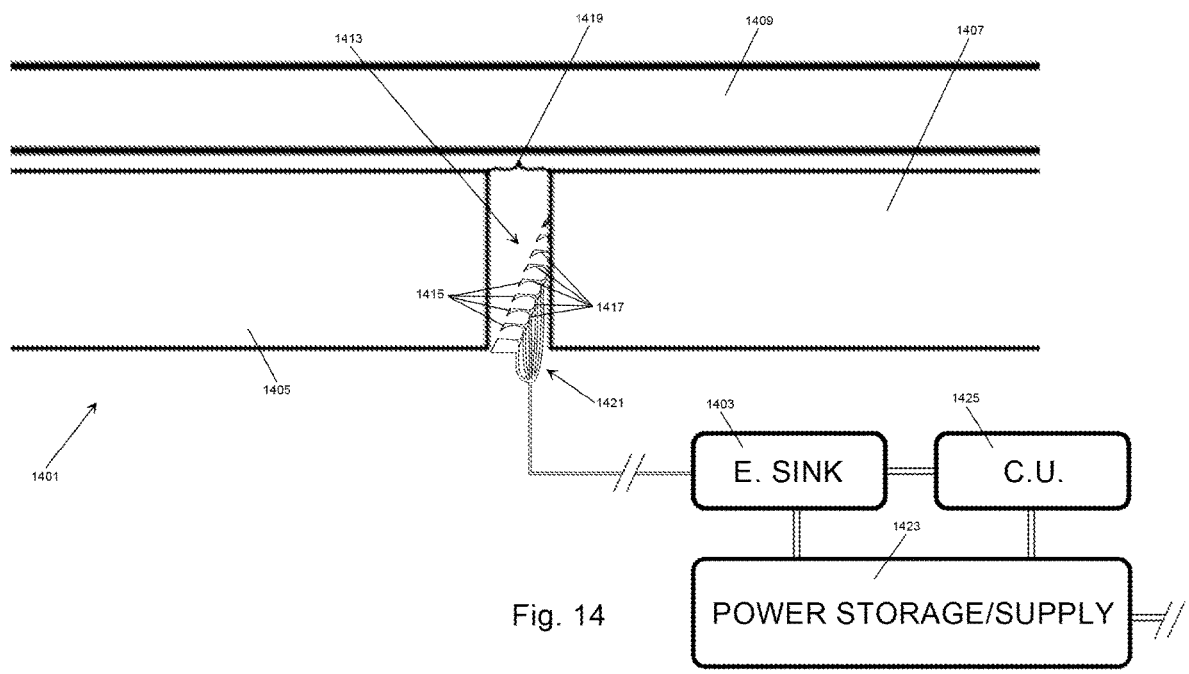
FIG. 14 is partial side view of a pixel, additional interstitial display aspects and a connected energy sink and power conversion system, which may be incorporated in a flat panel display in accordance with aspects of the present invention.

FIG. 14 is partial side view of a pixel 1401, additional interstitial display aspects and a connected energy sink 1403 and power conversion system, which may be incorporated in a flat panel display. As with FIG. 13, above, the pixel technology described with reference to FIG. 14 may be incorporated into a wide variety of display types, such as, but not limited to, the types of displays discussed above.

As with pixel 1301, discussed above, several subpixel components, namely left-hand color subpixel 1405 and right-hand color subpixel component 1407, are comprised in pixel 1401, and mounted between electrode materials (not pictured) and/or a transparent protective layer 1409 and a substrate material (not pictured). Covering the external view of the separation space 1419 between subpixel components 1405 and 1407 is a new form of reflective and absorptive interstitial component 1413. As with reflective insert 1315, discussed above, outward-facing facets, such as the examples shown as 1415 create a reflected image of a neighboring subpixel or pixel (in this instance, subpixel 1405) for a viewer looking in to space 1419, from any possible viewing angle outside the display, from the side facing the transparent protective layer 1409. In addition, however, indirect light absorptive surface materials and features, such as the examples pictured as 1417, are provided. Light-absorptive surface features 1417 absorb substantially all reflected or otherwise passed light reaching it, but, due to their position and orientation, especially receive light reflected by the side of pixel 1405, and other indirect sources. Features 1417 may be coated in matte black finish and materials, with several ridges of varying, descending grain sizes, to facilitate absorption. But to further facilitate light absorption, features 1417 preferably absorb photons by comprising a photo-voltaic (or, in other embodiments, other light energy-gathering, -converting and -transferring) device. Also preferably, that device comprises a material with valence electrons that may absorb and convert photons with energies in the visible spectrum, with a wide range of wavelengths, but especially in wavelengths occurring in viewing conditions likely to be encountered in a viewing area in common with the display, and likely to be reflected into the display, into electricity, (or, in some embodiments, other forms of energy). Even more preferably, the material is suited for rapid further absorption of photons, preferably with conversion of the photon energy to electrical energy. In the latter instance, electrical energy transfer cables 1421 are provided, and transfer that electrical energy, preferably, to a storage unit or energy sink 1403, suited to rapid, intermediate storage of electrical energy, such as a capacitor or capacitor bank, that is maintained at a positive charge and, in some embodiments, composed of at least one naturally conductive and electronegative material. Energy sink 1403 permits the rapid removal of energy from features 1417, and/or from similar features present elsewhere in the display, and accumulates electrical energy until it is unloaded and transferred into a longer-term storage device or power supply 1423. A control unit 1425 may control the transfer of energy to and from unit/energy sink 1403 and storage device or supply 1423, via switchable connections between them and, in some embodiments, other power transfer hardware (such as transformers, amplifiers, capacitors, and other gate-keeping hardware. In some embodiments, power absorbed by hardware controlled by the control unit can be repurposed, and combined with another power supply used by the display for its other operations. Among other benefits, the photon absorption aspects set forth herein enable the display to render the appearance (or, more accurately, the lack of appearance) of deeper blacks, when that color is rendered by a display, as well as purer versions of other rendered colors, by removing the impact of reflected, ambient light, to a degree not possible with masks and finishes alone. To further facilitate the absorption of reflected and other received light, features 1417 implement a multiple-reflection trajectory for any possible light path of light entering interstitial space 1419 and reaching them. In this way, features 1417 encounter a reflected light ray multiple times, if necessary, to increase the odds of substantial absorption.

It should be understood that the controlled photon-absorption and conversion techniques discussed above, although applied in the embodiment of reducing reflected, ambient light in inter-pixel spaces, they may be applied equally to the surfaces of pixels themselves, particularly, when transparent hardware is used, rather than matte-black materials. Even matte-black materials may be used, however, provided sufficient thinness or light transmission patterns are implemented.

Figure 15:
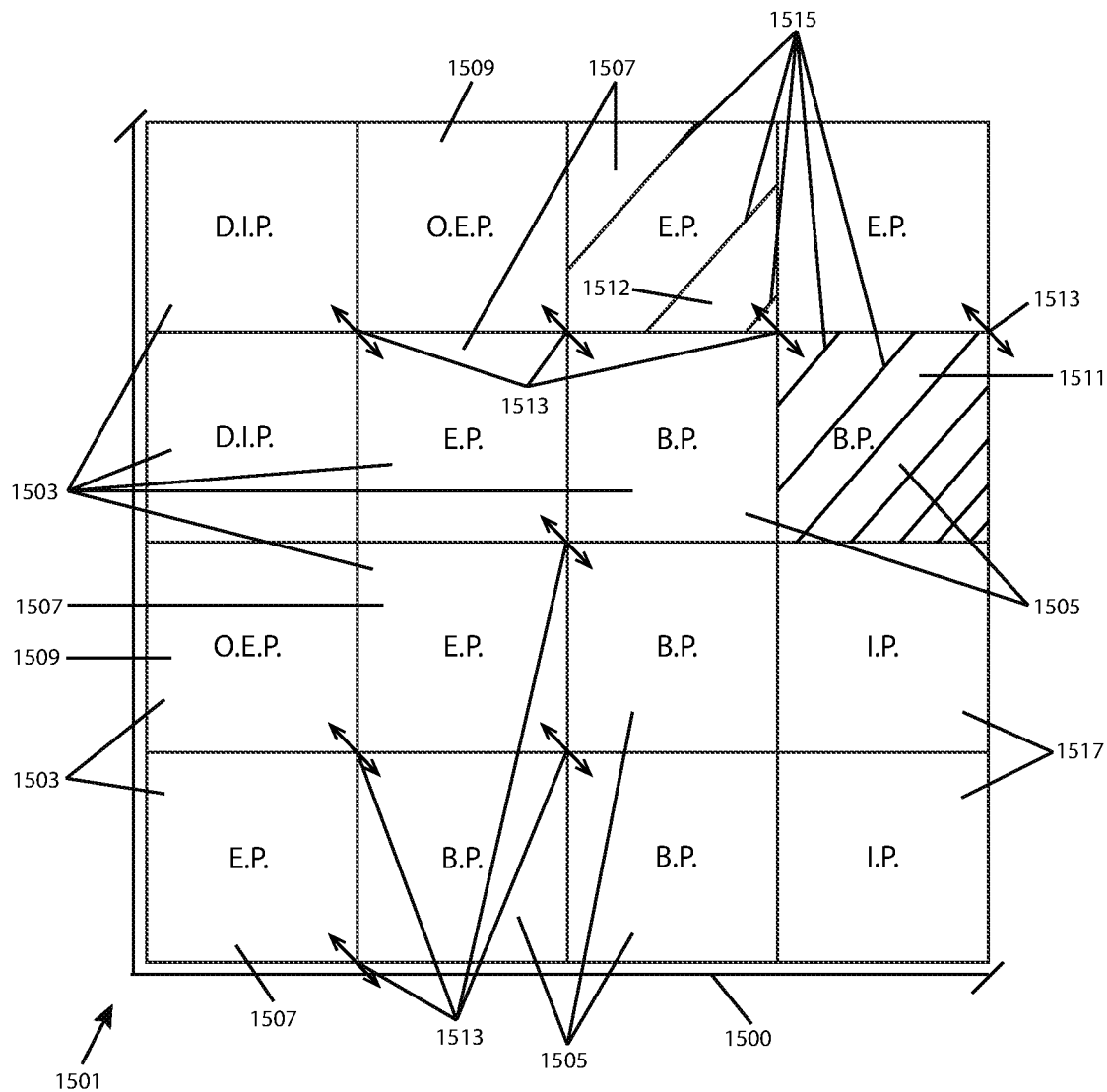
FIG. 15 is a front view of an array of pixels comprised in a display implementing aspects of the invention related to image enhancement.

FIG. 15 is a front view of an array of pixels 1501 comprised in a display (partially depicted as 1500) implementing aspects of the invention related to image enhancement. For simplicity, the view of the figure is partial, with just sixteen pixels, such as the examples shown as 1503, depicted. However, it should be understood that the larger display, of which examples 1503 are a part, may comprise many millions, billions, or trillions of such pixels. It should also be understood that, although the aspects of the invention discussed below are applied to individual pixels, each effect described herein may be applied to sub-components of or groups of neighboring pixels, applying the effects described herein for individual pixels across multiple neighboring pixels; in particular, this may be desirable in higher-resolution displays, with smaller pixels, to achieve an optimized image enhancement result. Each pixel comprises sub-pixel components, such as the pixel sub-components and devices discussed above, with reference to the previous figures. Thus, each pixel 1503 is preferably capable of producing a full range of visible color wavelengths, as implemented in modern display technologies suitable for viewing a wide variety of media.

As display 1500 is activated, and begins to display an image, the sixteen pixels begin to take on an appearance reflecting the data of whatever media is being displayed. The image may contain data reflecting image objects—meaning, images of entities or phenomena—with visible edges, borders or boundaries between them, in the image. Certain pixels will, as a result, be depicting (or substantially, mostly or partially depicting, or depicting more of than other neighboring pixels) the edge, border or boundary of a given object. For example, pixels 1505 so depicting the edge of such an object. The object depicted may be a lighter-colored object, or an object closer to the camera or other perspective view of the image, than a neighboring object. A control unit connected with and controlling display 1500 (such as the control system discussed above, with reference to FIG. 5) may aid in recognizing and defining such objects before or as they are displayed, by analyzing data of or associated with the image. For example, the control system can perform an edge or boundary detection algorithm on those data, to define pixels depicting the object and edges of the object. In other embodiments, however, the image data itself may comprise object definition data, created by a producer of the media to aid in implementing aspects of the invention set forth below. In other words, a media manufacturer, such as a film producer, may embed two-dimensional ("2-D") or 3D object data (which can be embedded automatically by a camera with range-finding, stereoscopy or other 3D object location and imaging technology, or in post-process), which embedded object data defines each pixel of the image as describing a particular object, the identity and location of that particular object on the display and relative to other objects, and/or other local attributes or object parts of the part of the object depicted by that pixel. In such an embodiment, the display control system may interpret that data to build temporary object libraries, and use the data and/or libraries to determine which pixels of the resulting display depict parts and edges of particular objects, and then implement aspects of the invention set forth below based on that information.

In the example provided in the figure, the control system has determined that boundary-depicting pixels 1505 (labeled "B.P.", for convenience) so depict parts of such an edge, border or boundary of such an object. Following that determination, the control system takes actions to enhance the appearance of the edge, border or boundary depicted by pixels 1505, leading it to stand out more clearly, and in a more life-like manner than without those actions, when implemented on certain common display technologies (such, but not limited to, certain LCD and OLED flat panel displays.) In one embodiment, pixels abutting each boundary- or edge-depicting pixel 1505—namely, edge enhancement pixels 1507 (labeled "E.P.")—are darkened or, more preferably, blackened, providing the appearance of a clearer, crisper edge with a greater contrast between pixels depicting the edge of the object and a neighboring background object. In some embodiments, the boundary-depicting pixels 1505 themselves may also be darkened, but, preferably, to smaller degree of darkening or blackening than the edge enhancement pixels 1507. Similarly, additional, outer enhancement pixels 1509 (labeled "O.E.P."), on the other side of boundary-depicting pixels 1507 from the object may be darkened or blackened, but also preferably to smaller degree than pixels 1507. Put differently, the darkening or blackening edge enhancement effect may be applied across a range of pixels abutting pixels 1507, as well as pixels 1507. Some forms of pixels may have a plurality of sub-pixel elements permitting the application of a darkening or blackening gradient or light-absorbing technology (such as that discussed in the previous figure), with such pixels carrying out these aspects in a more gradual manner across the range of the pixel, as shown with exemplary gradient pixels 1511 and 1512. Thus, in such embodiments, a boundary-depicting pixel, such as 1511, experiences a lightening gradient, moving toward the upper-left corner of pixel 1511, and that gradient continues (rather than starting over) darkening or blackening pixel 1512 in a gradient proceeding from the lower-right corner to the upper-right corner of pixel 1512. The darkening gradient preferably is applied in a direction normal to the tangent of the object's edge depicted by pixels 1505, but may, in other embodiments, be applied in a more approximate or rough direction facing away from the edge of a depicted object (e.g., the 45-degree angle pictured by graduating effect direction arrows 1513, and gradient-demonstrating lines 1515).

In some, but not all, embodiments, the darkening or blackening edge-enhancement effect is applied in a content-aware manner, rather than by applying absolute darkening or blackening level values to the pixels. For example, where other objects abutting boundary pixels 1505 have starting levels, prior to application of enhancement methods discussed above, that are lighter than others (e.g., above a threshold brightness value) compared relatively to inner object pixels 1517 (which depict interior aspects of the object, and are labeled "I.P."), the darkening or blackening amounts or gradients applied may be less than with objects (and their edges) initially depicted with darker pixels, while achieving similar edge-enhancement effects. In other embodiments, particular colors or textures may be applied, rather than a darkening or blackening effect, to pixels 1505, 1507 and 1509, to enhance the appearance of edges, depending on the neighboring colors and textures depicted by other pixels depicting the object. The object's size, or features (or the size and features of background objects) at the edge depicted by pixels 1505, and average levels light and color, and textures from the objects and features, may also be used to influence the size and degree of the darkening and gradients implemented—larger objects and features leading generally to larger gradients and numbers of pixels covered by the darkening and blackening effects. In other embodiments, the effects discussed in this section may be applied more diffusely (across more abutting pixels) with areas of an image that are out-of-focus, and to an amount depending on the degree that the object is in or out of focus, to avoid the creation of visual artifacts from the methods set forth with reference to the figure. Local focus data, specific to pixels or groups of pixels, may be implemented in much the same was as the pixel-to-object and edge relating data discussed above. In some scenarios, a lightening, rather than darkening or blackening effect, may be applied according to the methods set forth above, to enhance the appearance of object edges in the rare cases where edge brightness values are more greatly illuminated—for example, when lighting conditions illuminating the 3D object source of the image create highlights on the edge of the object in question. Such lighting conditions data may, as with the object data and other image-enhancement data discussed above, be included in a specialized file format, which may also set forth such data relative to each image source pixel, and each resulting display pixel on any possible display (whether or not the number of pixels of the source image and depicting display match).

Figure 16:
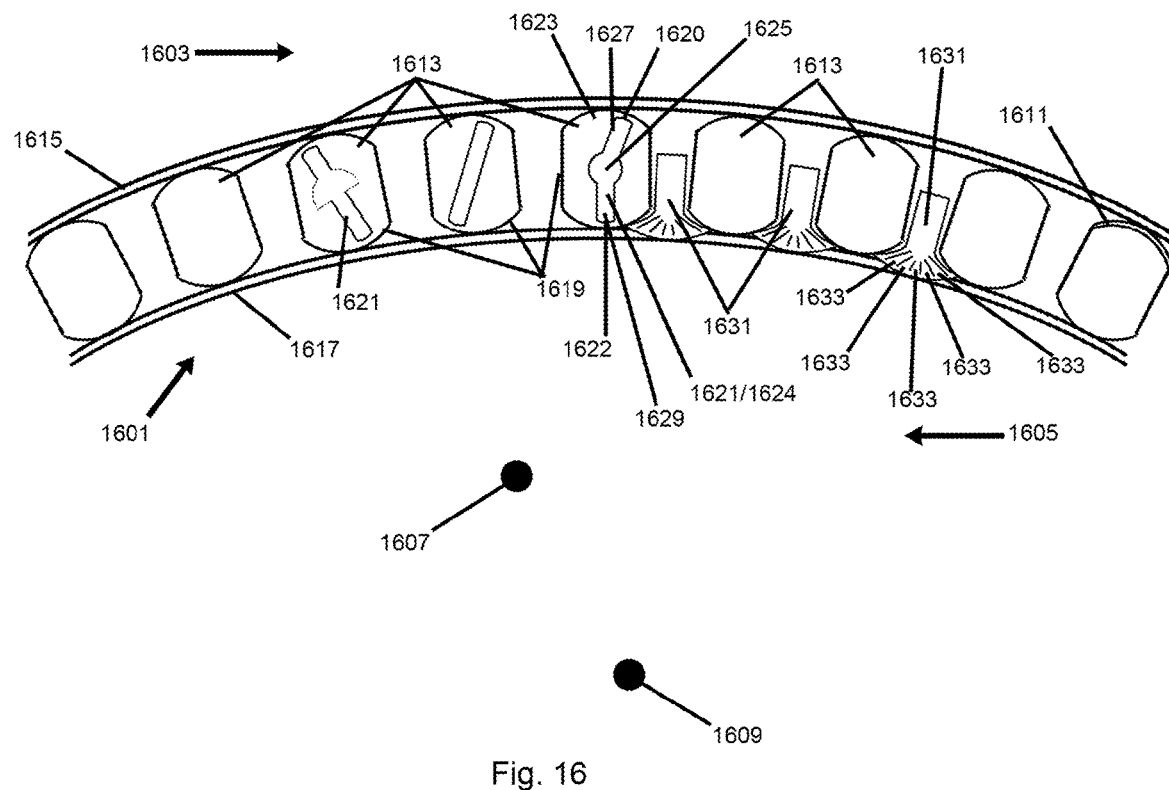
FIG. 16 is a top-view of elements of a variable-transparency display screen implemented "shifted reality," in accordance with aspects of the present invention.

FIG. 16 is a top-view of elements of a variable-transparency display screen 1601, in accordance with aspects of the present invention. As with other matrices and windows set forth in this application, display screen 1601 is capable of permitting the majority of light with an angle of propagation passing from observed side 1603 through to a viewing side 1605. On the viewing side of display 1605, a user may view objects situated on observed side 1603 from a wide variety of observation points, such as exemplary observation point 1607 and exemplary observation point 1609. In other words, one or more of users' eyes may be present at point 1607 or 1609 and, because display 1601 comprises all or mainly transparent components, users may view objects present on the other side of the display.

As with other embodiments set forth in the present application, display 1601 may comprise system-actuable shading components, such as example 1611, which tint, block or otherwise reduce the amount of light passing through display 1601 in accordance with signals transmitted to each of them by a control system, to reduce or augment the appearance of objects at an observation focal point. Also as with other shading elements in displays set forth in this application, 1611 may selectively directionally-shade light passing through display 1601, using separately shadable sub-components along the curved shading surface of component 1611 (not pictured).

In addition, display 1601 comprises new hardware components, configured to create a wide variety of new augmented reality and "shifted reality" visual effects, used with the components and embodiments discussed above in this application, and as will be demonstrated in greater detail below. First, display 1601 comprises pivotable fiber optic or other lens elements, such as the examples shown as 1613. Fiber optic/lens elements 1613 preferably populate display 1601 at regular or other intervals, substantially covering the space between at least two transparent outer layers—namely, an outward-facing layer 1615, and an inward-facing layer 1617. Each element 1613 preferably comprises a transparent housing, such as the examples pictured as 1619, shaped to permit an interior lens or fiber optic component, such as the examples pictured as 1621, to pivot in any three-dimensionally rotational direction (within rotational limits, in some embodiments). Each lens or fiber optic component 1621 is capable of receiving light from observed/outward side 1603 through a light-passing face 1620, and out to the viewing/inward side 1605 through another light-passing face 1622. By pivoting in a wide variety of possible 3D rotational directions, as directed by a control system (e.g., connected to and controlling rotational motors attached to each component 1621 and housing 1619) the light passing through each element 1613 can be redirected and otherwise altered, creating unique visual effects at any observation point selected by the control system. Display elements 1613 may occur in several possible lens and fiber optic shapes, configurations and other types, changing the concentration, focus and other properties of the light passing through it. For example, exemplary display element 1623 comprises an interior fiber optic component 1624 with a motorized joint 1625. By actuating motorized joint 1625 to alter the angle between an outward-facing length 1627 and a viewer-facing length 1629 of component 1624, light entering component 1624 in one direction of incidence (which direction intersects with exemplary observation/viewing point 1607) can pass through to viewing side 1605 at a different angle (now intersecting with observation/viewing point 1609). In this way, and using many such elements within a larger display than that shown in this simplified figure, a control system can create a perspective and view for a viewer at observation point 1609 that would normally occur at observation focal point 1607, among many other perspective changes. These changes can be made selectively by the control system, which may first define objects (which it seeks to change the apparent location, size or other factors of for a viewer). Other fiber optic or lens components may have lateral (side-mounted) light inlets, in addition to light-passing face 1620, allowing environmental light emanating from a lateral position to be passed toward a user. For example, other components may comprise outer mirrors, redirecting light hitting the sides of those components toward such light inlets in neighboring components.

Display 1601 can also be used to add entirely new virtual objects and effects, in addition to altering the appearance of existing virtual objects, with interstitial light creating pixel components, such as the examples shown as 1631. As with other pixels and pixel arrays discussed in this application, pixel components 1631 may comprise an L.E.D., L.C.D. or other electrically-actuable light emission component which, when activated by a control system, can be used to create the appearance of an object. Components 1631 comprise directional-emission sub-elements 1633, which also may emit light at a wide variety of emission angles, (much like fiber optic/lens components 1621) in any direction(s) facing any possible selected observation focal point necessary to create the appearance of any object, as directed by the control system controlling display 1601. It should be understood that, although shown in a limited, 2-D view, sub-elements 1633 may radiate light in substantially any 3D direction, toward a viewer/user. In this way, in addition to creating virtual objects and effects generally, display 1601 can be used to transmit a seamless blend of (1) existing light, viewable as real objects, (2) created light, viewable as virtual objects and effects, and (3) repurposed existing light, creating new views of real objects and effects and new virtual objects and effects at different observation focal points, in differing degrees selected by the control system. This new blend of mediated reality will be referred to hereinafter as "shifted reality."

Figure 17:
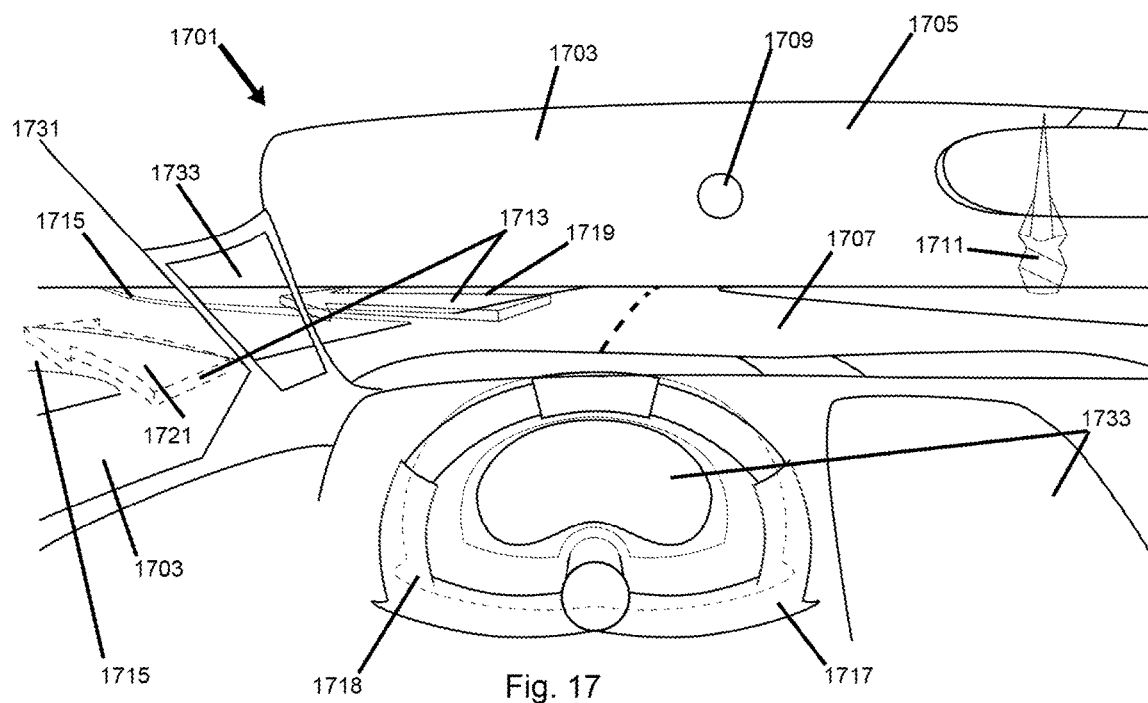
FIG. 17 is a perspective view of a specialized window display incorporated into a semi-autonomous vehicle, in accordance with the present invention.

FIG. 17 is a perspective view of a specialized window display incorporated into a semi-autonomous vehicle 1701, in accordance with the present invention. As with any other transparent window or other screen through which a user may view an environment, vehicle windows 1703 may comprise the display system discussed in reference to FIG. 16, above (but of a much greater size and with each described component in far greater numbers.) As such, any object viewed through windows 1703 may be augmented, mediated or altered by the "shifted reality" aspects set forth above.

For example, a user seated on the viewing side of display screen/windscreen 1705 may view objects of a real environment on the observed side (outside of the vehicle), such as roadway 1707, the sun 1709, or a point of interest 1711. In addition, a user may view control-system-mediated augmentations of such environmental objects.

For example, and as discussed in greater detail in semi-autonomous driving process flow FIG. 19, below, the display may present a user with various route choices by overlaying 3D virtual object route selection arrows 1713 over side-streets 1715. As also explained below, a user may use a stowable yoke 1717, and other input devices, to select from those route options (and provide other user input for the system). Yoke 1717 may be stowed by a user pressing it into a recessed well 1718, when not in use, enhancing personal comfort and freedom when not engaged in semi-autonomous or manual driving activities.) When selected, and when possible for the vehicle and its control system to execute safely (in light of other vehicles, vehicle speed, road conditions, etc.) the route markers may appear as solid shapes, as pictured for route marker 1719. If not, a selected route marker may appear as a dotted or otherwise visually-distinguished object, as pictured for route marker 1721. Similarly, a potential, but not selected route marker may appear with a different attribute to alert the user that the route is not selected, but available for selection. In some embodiments, as discussed below, a user may select or request an available route with an ordinary steering gesture (in this instance, turning the yoke immediately leftward to select the next available left turn.) If the requested route is not available, the user may also be provided with haptic feedback (e.g., a buzzing or physical twitch or click) to indicate route selections or unavailable routes.) In other embodiments, a user may place the control system into a "Manual" driving mode, wherein the yoke provides ordinary steering capabilities (and other driving controls provide other ordinary functionality). In addition, other interior panels of vehicle 1701 may be lined with specialized displays that, although curved as pictured for exemplary display screen 1601, above, can emit any image at the driver or other user's observation point—including an ordinary view of the road, as shown on structural pillar display 1731. Other such interior surface displays are shown as 1733. In some embodiments, the pillar display may serve as a rear view mirror by displaying the perspective of a rearward-facing camera.

Figure 18:
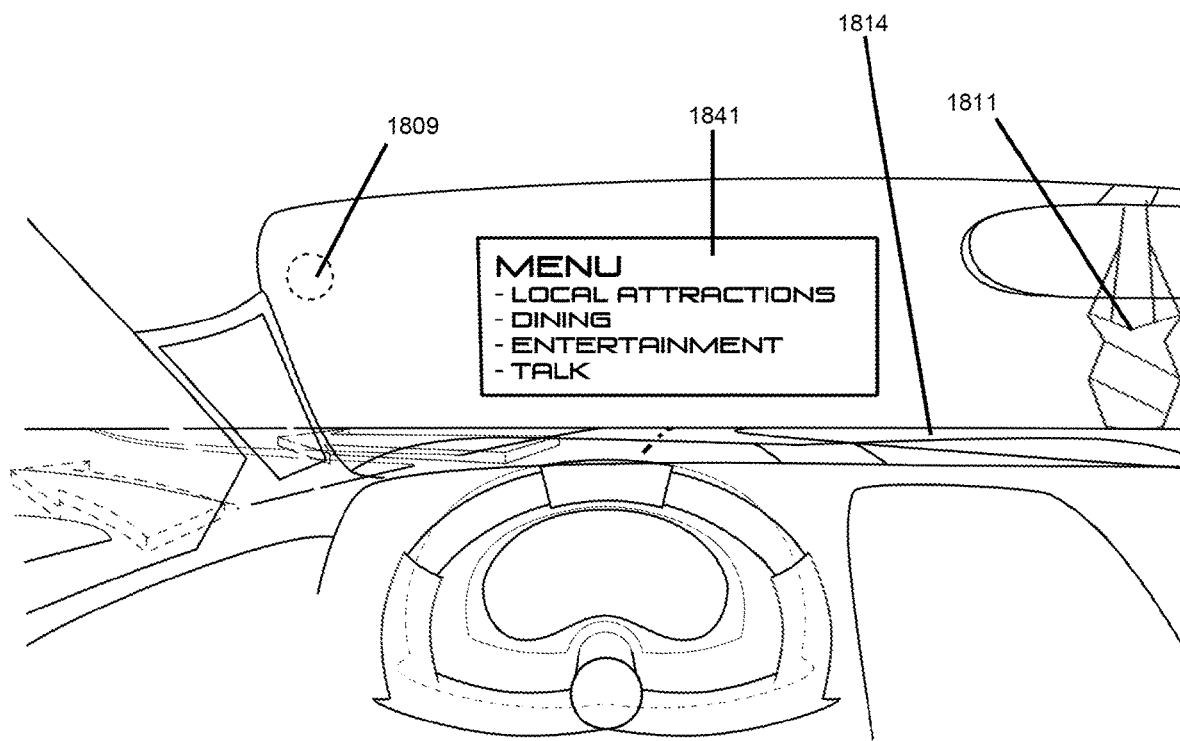
FIG. 18. is a perspective view of the same specialized window display as set forth in reference to FIG. 17, above, carrying out "shifted reality" aspects of the present invention.

FIG. 18. is a perspective view of the same specialized window display as set forth in reference to FIG. 17, above, carrying out "shifted reality" aspects of the present invention. During autonomous, or semi-autonomous driving procedures, as discussed in greater detail below, a user may be presented with informational menus, game environments, or other highly augmented or shifted reality displays, as set forth in this application. In these aspects, the appearance of the user's environments may be highly modified, while still maintaining environmental light, as discussed above. For example, in the scene depicted in the figure, the user and/or the control system has called up an informational operations menu 1841. In order for the user to see the information on this screen menu more clearly, and without losing total view of the outside environment, the apparent location of various objects has been shifted for a user at the observation focal point corresponding with the perspective of the figure. For example, both point of interest (now 1811) and the sun (1809) have been shifted outward, to the periphery of menu 1841, and other environmental aspects of the scene have been warped out of the way, and downward (1814).

Similarly, if the user requests more information concerning point of interest 1811, it may become enlarged, appearing closer than before, as shown in this figure, to be seen more clearly. Conversely, a distracting, unpleasant aspect, such as the sun 1809 in the user's eyes, may be reduced or removed altogether, or otherwise enhanced in appearance, as pictured.

Figure 19:
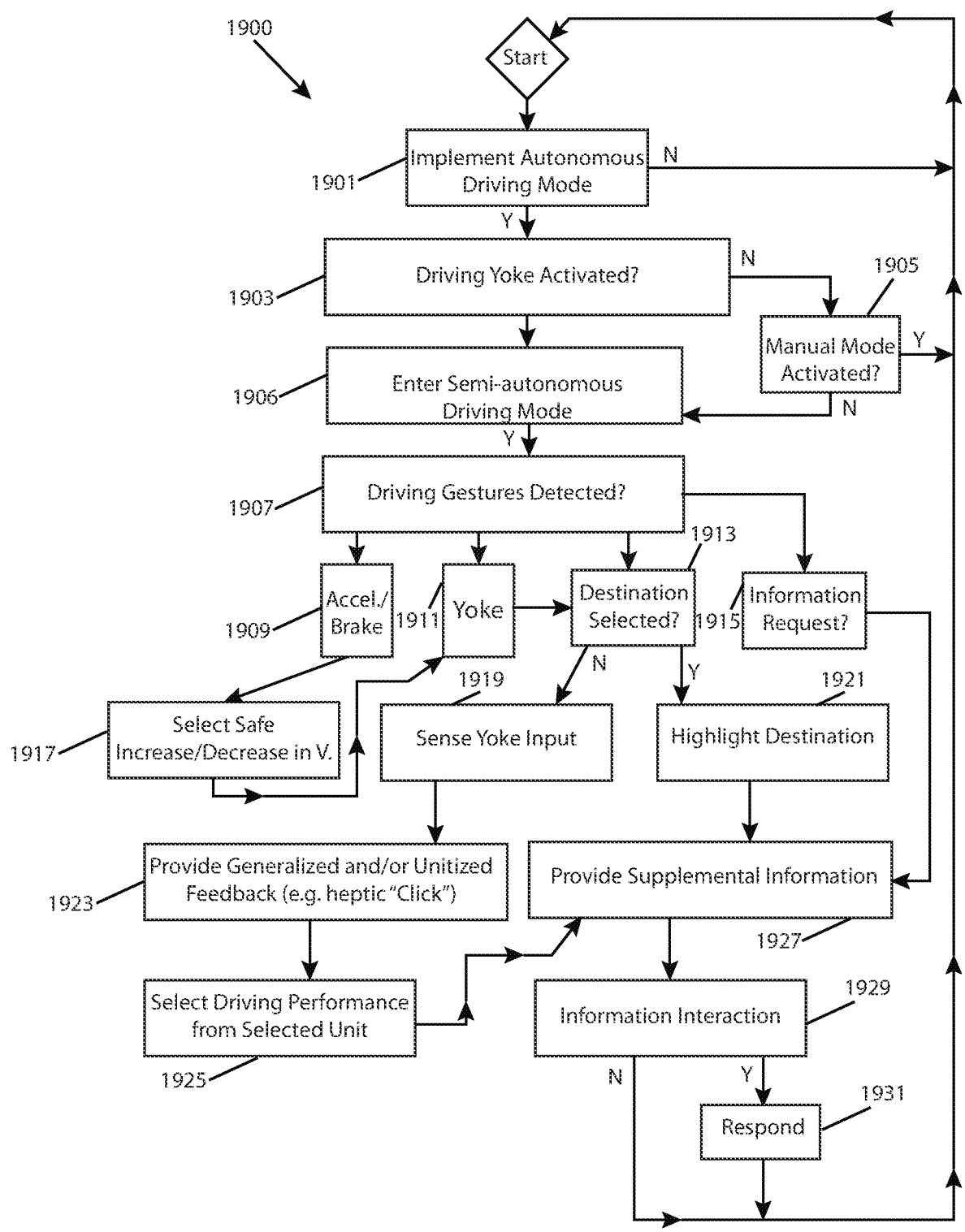
FIG. 19 is a process flow diagram of exemplary steps carried out by a semi-autonomous vehicle, in accordance with aspects of the present invention.

FIG. 19 is a process flow diagram of exemplary steps 1900 carried out by a semi-autonomous vehicle, in accordance with aspects of the present invention. Beginning with Step 1901, a control system controlling hardware set forth in reference to the figures above enters an autonomous driving mode, and proceeds to step 1903, in which it determines if a driving control, such as a steering wheel or yoke, has been activated (e.g., by a user de-stowing or gripping it sufficiently). The control system then enters a semi-autonomous driving mode, by default, to mediate any safety issues with entering a manual driving mode (where a user is in full control of vehicle driving functions, such as steering and acceleration) initially. Next, the control system may determine if the user has selected the activation of such a manual driving mode in step 1905 and, if not, enters an alternative, semi-autonomous driving mode, in step 1906. The control system next determines whether particular driving gestures are being input by a user, in steps 1909, 1911, 1913 and 1915, and, if so, proceeds to step 1911 et seq.

For example, in step 1909, the control system determines whether a user is actuating the accelerator pedal or other throttle or brake pedal, to request an increase or decrease in the amount of speed for the vehicle. The control system may then assess, using on board gauges and sensors, whether such an increase or decrease in speed falls within safety parameters, legal restrictions, environmental and traffic conditions, different velocity limits and other constraints of the safe semi-autonomous driving program (which may be variably set according to different jurisdictions, vehicles and road conditions, in some embodiments.) If an increase in speed falls within such safe driving limits, the control system may proceed to increase or decrease the vehicle's speed in accordance with the requested change in vehicle speed, in step 1917. In step 1911, the control system may determine (as discussed in some detail above) whether the user has activated, gripped or removed a steering yoke from a storage recess, indicating a desire to direct the vehicle. In some embodiments, the control system may allow the user to steer the vehicle within particular semi-autonomous driving limits (according to control system programs having a higher margin of safety than any limits placed in a manual driving mode). In other embodiments, the control system may limit effective yoke input, or the user may indicate a yoke input for, more general input selections, such as selecting between available control system-mapped routes, as discussed above in reference to FIGS. 17 and 18. As also discussed above, the control system may provide feedback regarding input or execution limits within the semi-autonomous driving mode, in step 1923, while only executing driving maneuvers from a subset of acceptable driving performance programs, in step 1925. The control system may determine if such route or destination selections have been made in step 1913, and proceed to highlight that route on the display in step 1921, and travel toward that destination. The control system may provide the user with other relevant information concerning the geographic area or other aspects of the destination or vehicle environment, as well as other useful or entertaining information or programs in step 1927. In some programs, a user may interact further with the control system (e.g., selecting movies, music, telecommunications systems and/or games) in steps 1929 and 1931.

Figure 20:
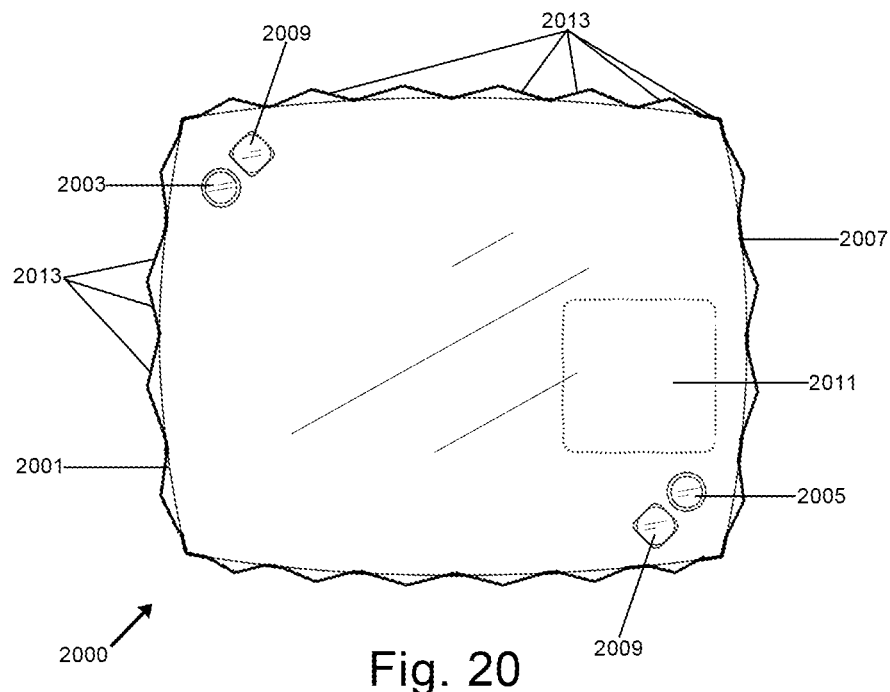
FIG. 20 is a front-view of an exemplary personal environment viewing and scanning device, comprising a display configured for augmented reality effects and an array of simultaneously deployed sensors and cameras.

FIG. 20 is a front-view of an exemplary personal environment viewing and scanning device 2000, comprising a display 2001 configured for creating augmented reality (and shifted reality, specifically) with an array of simultaneously deployed sensors and cameras. More specifically, device 2000 comprises two exemplary, user-facing cameras, 2003 and 2005, mounted in a device housing 2007 (on the same side of the housing as display 2001). Cameras 2003 and 2005 are preferably separated from one another and from at least one auxiliary sensor(s), 2009, in space. Each of cameras 2003 and 2005 and sensor(s) 2009, face outward in slightly different directions and/or with different focal lengths, depth-of-field or other aspects changing their perspective of the viewable environment on the side of the housing comprising the display. However, preferably, cameras 2003 and 2005, and sensor(s) 2009, each have a view of substantially the same areas (or regions of space) in that environment. Device 2000 also comprises a control system 2011 (which may be a control system such as that disclosed in reference to FIG. 5, above) and/or is connected to and able to communicate with a control system, which is connected to and able to communicate with each of cameras 2003 and 2005 (e.g., through electronic conduits), and any other cameras and sensors comprised in device 2000. Thus, by scanning the same environment from differing angles, the control system 2011, controlling cameras 2003 and 2005 and sensor(s) 2009, can assess the 3D appearance and 3D content orientation and even the content of any object identified within the environment.

As will be discussed in greater detail below, in reference to FIG. 21, device 2000 and housing 2007 also comprise a series of angled surfaces, such as the examples pictured as 2013, each facing outward from device 2000, and, as with cameras 2003 and 2005 and sensor(s) 2009, oriented in different directions outward (such as skewed angles), relative to one another and the environment. As with the light transmission elements and hardware discussed in reference to FIGS. 12-16, above, each angled surface 2013 may also comprise all, or mainly, transparent components and hardware components configured for implementing augmented reality and shifted reality visual effects, such as the examples set forth in reference to FIG. 16, above. The display 2001 may directly abut angled surfaces 2013 or another transparent intermediate material, and may also be a transparent light transmission medium or component, as set forth with respect to FIGS. 12-16, above. Also, as with other figures set forth in this application, display device 2000 may comprise hardware for selectively shading and enhancing environmental light destined for observation focal points defined by the control system. For example, in a preferred method, the control system 2011 scans the environment facing device 2000 and display 2001, and identifies the location and orientation of a user's eyes (if present). The control system may then define and track an observation focal point based on the user's eye location and orientation, in real time, and create shading to reduce glare and enhance the viewability of environmental objects, and create the appearance of virtual objects, on the other side of device 2000 (discussed in greater detail below) as discussed in reference to the figures set forth above in this application.

Figure 21:
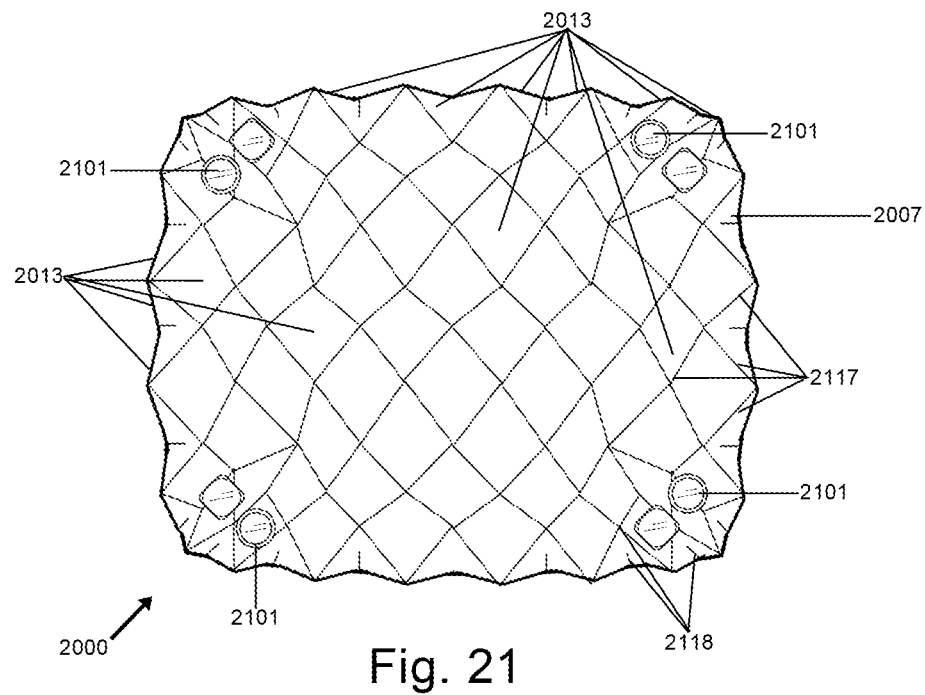
FIG. 21 is a rear-view of the same exemplary personal environment viewing and scanning device, and showing an exemplary array of sensors and cameras, as well as exemplary grip and shock-absorption aspects.

Although better viewed in FIG. 21, among other advantages, angled surfaces 2013 create grippable regions, facilitating a user's handling of the device 2000 which, preferably, is of a size suitable for holding within the expanse of most outstretched human hands.

FIG. 21 is a rear-view of the same exemplary personal environment viewing and scanning device 2000, and showing an exemplary array of additional cameras 2101 and sensors 2103, as well as exemplary grip and shock-absorption aspects comprised in housing 2007. As discussed immediately above, the grippable, angled surfaces 2013 of device 2000, facing outward at variegated angles, yet substantially covering the outward-facing surface of device 2000 and joined with one another at their edges, can be seen more clearly in the present figure. Also as mentioned above, angled surfaces 2013 create grippable, outward-protruding edges, such as the examples shown as 2117, and finger-cradling, indented valleys, such as the examples shown as 2118, for a user's hand, gripping the side of device 2000 shown in the present figure. In some embodiments, edges 2117 and 2118 comprise flexible, elastomeric and/or cushioning and trauma-resistant materials, such as plastics, rubbers or other suitable polymers or easily-formed grip and bumper materials. However, preferably, that material is also suitably transparent or small enough in profile not to interfere with the imaging capabilities of optical and other sensor hardware within angled surfaces 2013.

Because the side of device 2000 shown in the present figure comprises a plurality of cameras and/or other sensors, the control system 2011 (not pictured in the present figure) may select from any or all of them to image the surrounding environment, and create augmented reality objects and other enhancements, in accordance with aspects of the present invention. In a preferred method, the control unit determines whether any of the available sensors are substantially blocked from viewing the environment by a user's hand or other object, for example, by determining that a useable portion of each camera or sensor has been blacked out (e.g., too low a light level to register gray scale, curved histogram). If so, the control unit turns off or disregards data from that camera(s) or sensor(s) in generating imaging and 3D object orientation, structure, composition and location data, as set forth elsewhere in this application. In general, during ordinary holding and usage of device 2000, at least a plurality of camera(s) and/or sensor(s) will be available for scanning and producing such 3D object orientation, structure, composition and location data. This and other methodology of the present invention is discussed in greater detail below, in reference to FIG. 22, immediately below.

It should be mentioned that, in some embodiments, the sensor and light transmission hardware may co-exist, in a single subdevice, such as angled surfaces 2013. In addition, in some embodiments, transmission and light generation may be in any direction selected by the control system, to generate visual affects throughout a surrounding space, not just towards the display side of device 2000.

It should also be noted that the sensors set forth above may be any suitable sensors and devices known in the art for tracking, imaging and mapping objects, orientations, structures, compositions and/or shapes in 3D space. For example, in some embodiments, the sensor's are directional ultrasound sensors, or miniature (low magnetic field strength) MRI machines, Infrared Sensors or ordinary cameras, controlled by computer hardware for determining and mapping 3D objects and tracking their locations and orientations within the surrounding environment.

Figure 22:
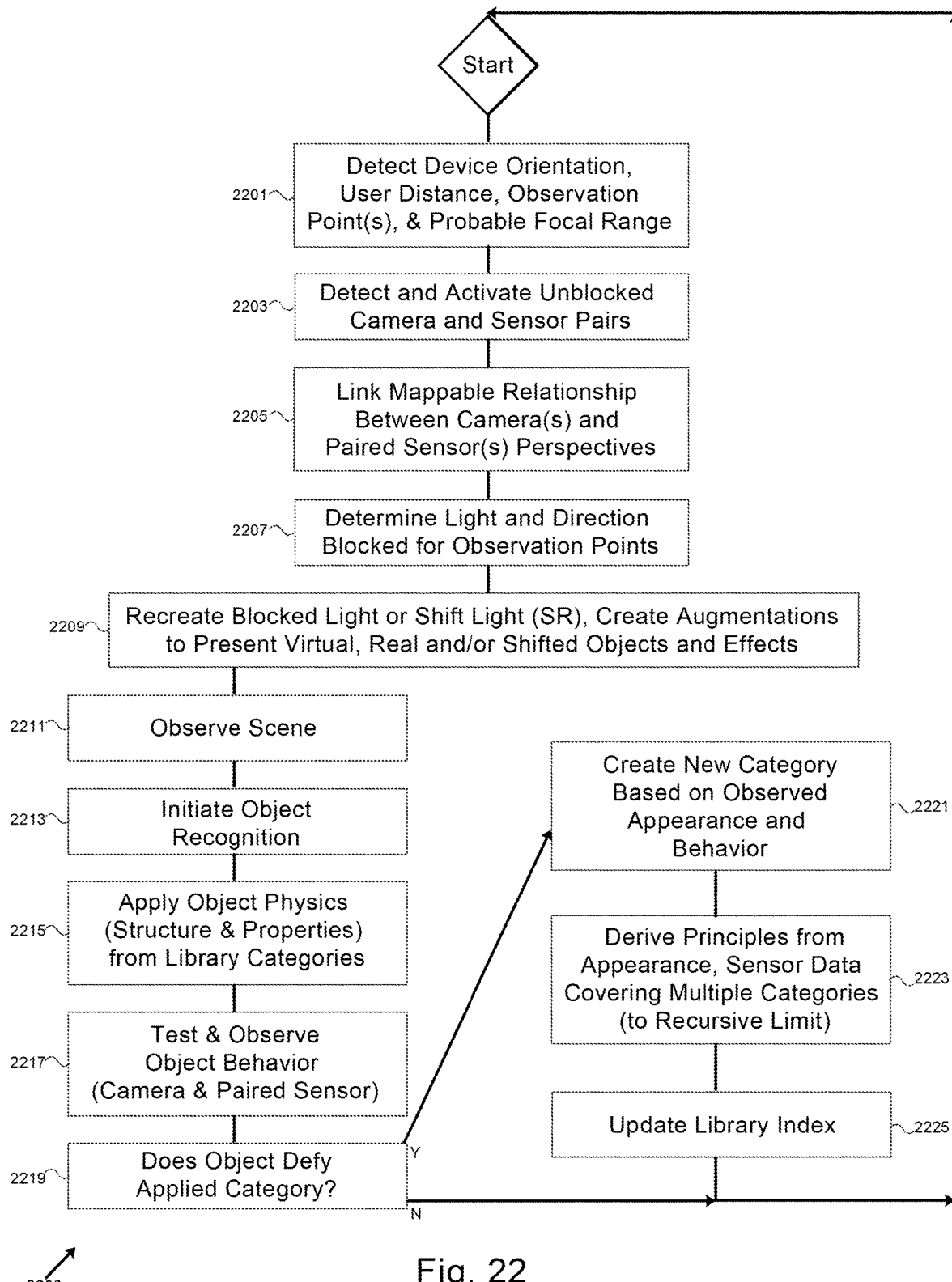
FIG. 22 is an exemplary process flow diagram of exemplary steps, which may be carried out by a personal environment viewing and scanning device, such as the example described in reference to FIGS. 20 and 21, above.

FIG. 22 is an exemplary process flow diagram of exemplary steps 2200, which may be carried out by a personal environment viewing and scanning device, such as the example described in reference to FIGS. 20 and 21, and elsewhere, above.

Beginning with step 2201, the control system of device 2000 (such as control system 2011, set forth above), detects a user's eye location and orientation (for example, using camera(s) 2003 and 2005 and/or sensor(s) 2009) in 3D space relative to the device, and defines the location of the observation focal points for a user, based on that data, in real time. The control system may also determine its own location and orientation in space, using comprises compass(es) and/or accelerometers, or GPS data, communicated through antennas, and then define and track the observation focal points relative to the Earth, correcting for movement of device 2000. Based on the user's eye orientation and distance from a viewed environmental object (or the device), the control system may also define a probable focal point for the user's eyes, and, therefore, a distance from the viewed object and a likely focal length necessary to render an image for the user. The control system then proceeds to step 2203, in which (as discussed above, in reference to FIG. 21) it determines whether any of the available sensors and/or camera(s) (preferably, on the side of the device pictured in FIG. 21) are substantially blocked from viewing the environment by a user's hand or other object, for example, by determining that a useable portion of each camera or sensor has been blacked out (e.g., too low a light level to register gray scale, curved histogram). If so, the control unit turns off or disregards data from that camera(s) or sensor(s) in generating imaging and 3D object orientation, structure, composition and location data, as set forth elsewhere in this application. Next, in step 2205, the control unit may use the camera(s) and sensor(s) to image and scan any environmental object(s), and build a 3D map of details of the objects. After that, the control system may link image and 3D object map components to sensor and camera data giving rise to them. The control unit then builds a mapped relationship between the data giving rise to single object aspects, originating from multiple camera(s) and paired sensor(s) with differing perspectives. Proceeding to step 2207, the control unit next determines what light paths in the environment will intersect with the observation focal points, forming an image for the user, or, which would form an image for the user, except that it is blocked by the device or another object, which may then be selectively removed from view through image creation aspects set forth in the present application.

(In some embodiments, the sensors and cameras are present outside of the confines of the device, such as by scattering throughout the environment, and wireless communications with the control system, enabling the imaging and rendering of any objects, and removal of any other objects, from view, at the user's selection.) To do so, the control system next recreates the light blocked by those object(s), for example, by transmitting and shifting the perspective of the environment using shifted reality aspects of the present invention, set forth above, or by otherwise generating virtual objects, augmentations or other effects, in step 2209.

As mentioned above, the control system, and other control systems networked with the control system (e.g., via the Internet and a Blockchain) may maintain an Index of all world objects—both specifically and by category—in part, by recording 3D and ordinary imaging data gathered by the camera(s) and sensor(s) of the device. The resulting library of objects and categories may then be periodically updated by subsequent tests and observations, implemented by the control system, an examples of which are set forth in steps 2211 et seq.

In steps 2211 and 2213, the control system may again observe the surrounding environment of the device, and match the resulting image and 3D data to images and sensor data recorded previously, to identify any objects or categories of objects present in the environmental scene (e.g., by confidence interval match, perspective analysis, and interpolation of gaps at several levels), which have been identified previously. In step 2215, the control system may create simulations, using the display sub-device(s) of device 2000, of the objects, for virtual imaging, enhancement and virtual experiments relating to the real objects. To do so, physics models may be built from the data stored in the library, and related to the identified objects and object categories. For example, if a car tire is viewed and identified by the control system as an object, and then simulated with the display as a virtual object, the user could use the user interface of the device to hit (e.g., gesture at) the virtual object representing the tire, and the virtual object would then rebound to the user's touch, based on the stored physics of the rubber tire category that the control system has placed the tire within as an object. In this way, a user can hit, or otherwise manipulate, virtual objects representing all real world objects, immediately, on the scene, without interfering with the real world version of the viewed object. Of course, the user can still manipulate the real world object corresponding with the virtual object any time and, if so, the control system may continue to monitor its behavior, and update both the object data and the category applicable to it, even creating new categories, if the previous data does not match previous data. For example, and to extend the example, if the user "kicks" the real world tire corresponding with the virtual object tire, and the tire does not, in fact, rebound or yield at all, defying the category characteristics in step 2219, the control unit may create a new category for tire-like wheels that are composed of a hard material, and assign the object those new characteristics, in the library, in steps 2221 through 2225. There is no limit to the possible number of categories which may be built, with several categories arising for each object, through different levels of generalization. For example, for the tire, the category of round objects, wheel, tire, and ridged surface objects, may each be created. It should also be understood that, although the example of visualization of objects is given, any form of sensory detection may be subject to the same, or similar methodology as set forth in this application. For example, if the howling of a skidding tire is heard by a microphone controlled by the control system, the category of elastomeric objects may be applied to the object, just as surely as by observing it yield to a user's touch.

I claim:

1. A system for enhancing a user's view comprising:
hardware configured to define observation point(s) or region(s);
hardware configured to reduce light transmission through one or more area(s) of a screen by an amount based on whether said light transmission would result in transcending a threshold limit of luminance at said observation point(s) or region(s); and
a camera(s) and/or sensor(s) configured to determine luminance at said observation point(s) or region(s) that would occur if said light transmission were not reduced;
wherein said threshold limit of luminance is based, at least in part, on environmental light information; and
wherein said hardware configured to reduce light transmission is configured to allow at least some other light to pass through the screen, without reducing said at least some other light by said amount.

2. The system for enhancing a user's view of claim 1, wherein the system is configured to provide virtual objects using augmented reality hardware.

3. The system for enhancing a user's view of claim 2, wherein the system is configured to provide virtual objects using shifted reality hardware.

4. The system for enhancing a user's view of claim 1, wherein the system is configured to provide virtual objects using shifted reality hardware.

5. The system for enhancing a user's view of claim 1, wherein the system is configured to allow said user to set the location(s) of said observation point(s) or region(s) by using a device(s) and/or control(s) comprised in a passenger-carrying vehicle comprising said screen.

6. The system for enhancing a user's view of claim 5, wherein the device(s) and/or control(s) comprise(s) a device that controls a function of said passenger-carrying vehicle other than said enhancing.

7. The system for enhancing a user's view of claim 1, wherein the system augments at least part of said first area(s) based on potential danger posed by an object.

8. The system for enhancing a user's view of claim 1, wherein the system comprises a plurality of light-diverting components, and wherein the system is configured to use said light-diverting components to create an image enhancing the visibility of an object by diverting light emanating from the object and transmitting it to a location different from where it would arrive without creating said image.

9. A system for enhancing a user's view comprising:
hardware configured to define observation point(s) or region(s);
hardware configured to reduce light transmission through one or more first area(s) of a screen by an amount based on whether said light transmission would result in transcending a threshold limit of luminance at said observation point(s) or region(s);
wherein said threshold limit of luminance is based, at least in part, on environmental light information;
wherein said hardware configured to reduce light transmission is configured to allow at least some other light to pass through the screen, without reducing said at least some other light by said amount, through one or more additional areas(s) of said screen; and
wherein the system is configured to create margin(s) of shading around at least one of said first area(s).

10. The system for enhancing a user's view of claim 9, wherein the system is configured to expand said margin(s) of shading.

11. The system for enhancing a user's view of claim 10, wherein the system is configured to expand said margin(s) of shading based on data provided by one or more sensor(s).

12. The system for enhancing a user's view of claim 10, wherein the system is configured to expand said margin(s) of shading based on said user's actuation of a control or other input device.

13. The system for enhancing a user's view of claim 10, wherein the system is configured to expand said margin(s) of shading at areas to lead movement of a light source(s).

14. The system for enhancing a user's view of claim 9, wherein the system is configured to relocate said margin(s) of shading.

15. The system for enhancing a user's view of claim 14, wherein the system is configured to relocate said margin(s) of shading based on data provided by one or more sensor(s).

16. The system for enhancing a user's view of claim 9, wherein the system is configured to contract said margin(s) of shading.

17. The system for enhancing a user's view of claim 16, wherein the system is configured to contract said margin(s) of shading based on data provided by one or more sensor(s).

18. The system for enhancing a user's view of claim 9, wherein the system is configured to create said margin(s) of shading at areas to lead movement of a light source(s).

19. The system of claim 9, wherein the system determines a probable future location of a light source(s) and creates said first area(s) and/or said margin(s) of shading to intercept light from said probable future location of said light source(s).

20. A method for enhancing a user's view, comprising the following steps:
providing a device for enhancing a user's view, comprising:
hardware configured to define observation point(s) or region(s);
shifted reality hardware; and
hardware configured to reduce light transmission through one or more area(s) of a screen, by an amount based on whether said reduced light would transcend a threshold limit of luminance at said observation point(s) or region(s);
wherein said threshold limit of luminance is based, at least in part, on environmental light information; and
wherein said hardware configured to reduce light transmission is configured to allow at least some other light to pass through the screen, without reducing said other light by said amount; and
creating virtual objects using said shifted reality hardware.

* * * * *